US006760164B2

(12) United States Patent
Togino

(10) Patent No.: US 6,760,164 B2
(45) Date of Patent: Jul. 6, 2004

(54) OPTICAL SYSTEM

(75) Inventor: Takayoshi Togino, Koganei (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/083,578

(22) Filed: Feb. 27, 2002

(65) Prior Publication Data
US 2003/0002163 A1 Jan. 2, 2003

(30) Foreign Application Priority Data

Mar. 1, 2001 (JP) .......................................... 2001-056473
Oct. 30, 2001 (JP) .......................................... 2001-332290

(51) Int. Cl.$^7$ ............................. G02B 15/14; G02B 3/02
(52) U.S. Cl. ........................................ 359/720; 359/678
(58) Field of Search ................................. 359/678, 720, 359/730, 736, 793

Primary Examiner—David N. Spector
(74) Attorney, Agent, or Firm—Pillsbury Winthrop LLP

(57) ABSTRACT

The invention provides an optical system that enables focal length, image-formation position, etc. to be controlled in simple construction by bending the optical system to shift a light beam passing through it and so making use of an arbitrary portion of the optical system. In an image-formation optical system comprising at least two optical elements $S_1$ and $S_2$, the at least two optical elements $S_1$ and $S_2$ are mutually decentered to vary the properties such as magnification.

12 Claims, 18 Drawing Sheets

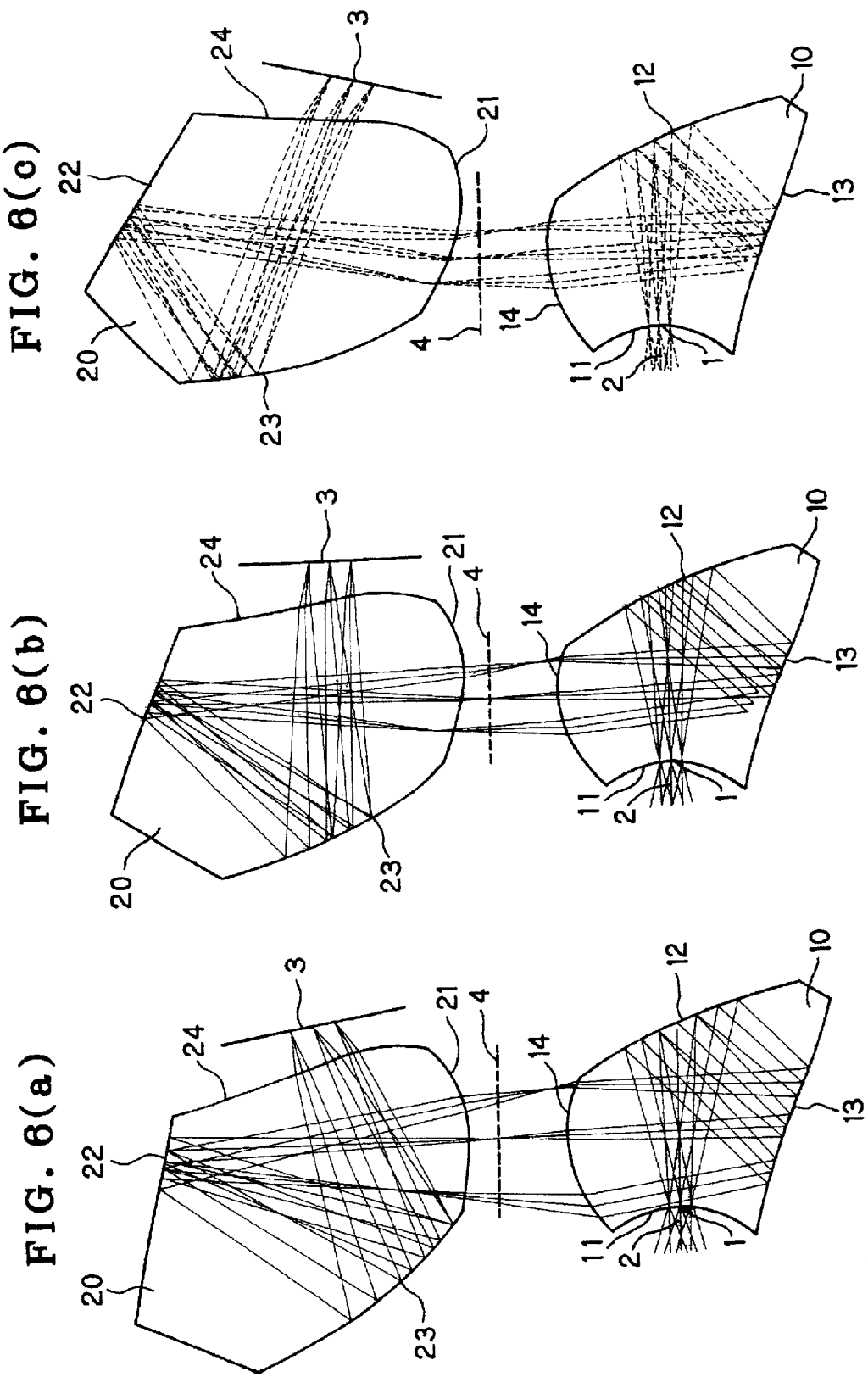

FIG. 17(b)
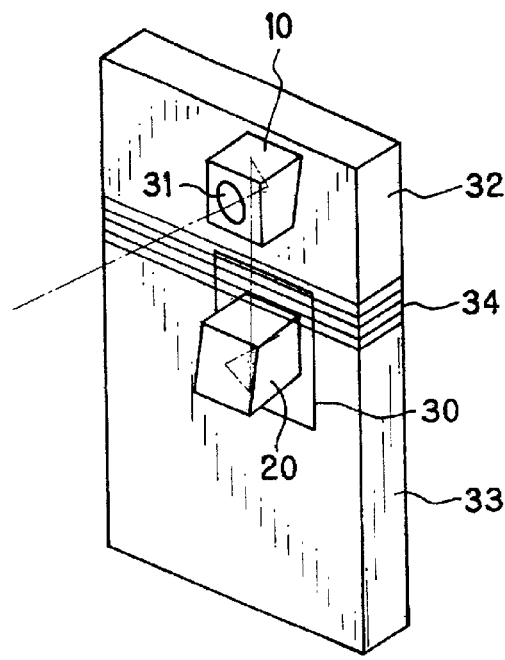
FIG. 17(c)
FIG. 17(a)
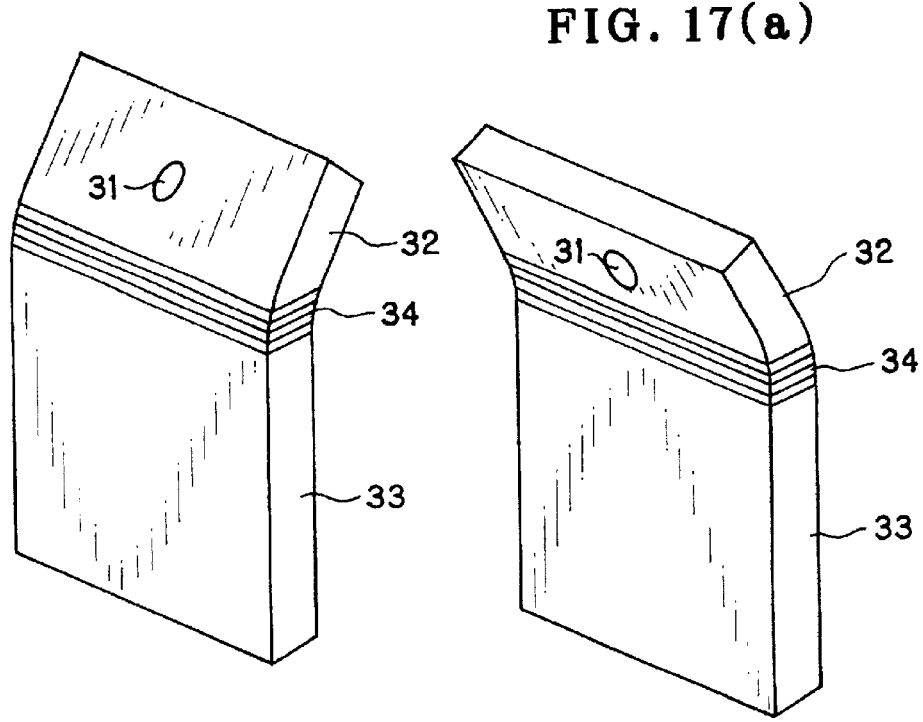

OPTICAL SYSTEM

This application claims benefit of Japanese Application Nos. 2001-56473 and 2001-332290 filed in Japan on 3.1.2001 and 10.30,2001, the contents of which are herein incorporated by this reference.

BACKGROUND OF THE INVENTION

The present invention relates generally to an optical system, and more particularly to an optical system used with an image pickup optical system having zooming (scaling) and focusing functions, etc.

Zoom image pickup optical systems constructed of free-form surface prisms, for instance, are disclosed in JP-A's 08-292372, 11-317894 and 11-317895.

However, the optical system of JP-A 08-292372 is designed for zooming or scaling by movement of a plurality of prisms. This requires an increase in size to provide sufficient space for the movement of the prisms in the system. Moreover, high accuracy needed for a mechanism for precise linear movement of the prisms makes the system structurally complicated providing obstacles to assembling the system and increased cost.

Similarly, the zooming or scaling mechanism of JP-A 11-317894, and JP-A 11-317895 has the same structural problem because of the movement of transmitting lens optical element.

With the prior art, it is thus impossible to achieve any zoom (scaling) optical system of smaller size because of the required space for movement of the optical element. This optical element itself has aberration problems, and renders optical parameters so likely to vary by large amounts that it may not be used.

Ordinary control of zooming (scaling) or focusing is generally carried out by moving several optical elements in an optical system along the optical axis. However, problems with this control mode are that it is difficult to move the optical elements completely parallel to the optical axis, causing tilting and decentration of the optical elements and, hence, degradation of images. Especially when a zooming (scaling) optical system is designed for an image pickup system of smaller size, very stringent, if not impossible, accuracy is imposed on the movement.

SUMMARY OF THE INVENTION

In view of such problems of the prior art, one object of the present invention is to provide an optical system of so simplified construction that its focal length, image-formation position, etc. can be controlled by bending the optical system to shift a light beam passing through the optical system and thereby making selective use of an arbitrary portion of the optical system.

According to one aspect of the invention, this object is achieved by the provision of an optical system, characterized in that said optical system is transformed to bend an optical axis thereof, so that paraxial amounts thereof can be varied.

According to another aspect of the invention, there is provided an image-formation optical system comprising at least two optical elements, characterized in that said at least two optical elements are mutually decentered, thereby varying the properties of said optical system.

Preferably in this embodiment, the optical system should be constructed of a first optical element located on the object side thereof for forming a primary image and a second optical element for projecting the primary image onto an image plane of the optical system. This second optical element is decentered by rotation with the center of rotation defined by the vicinity of the primary image.

Preferably in this embodiment, at least one of the first and second optical elements should be formed of an optical element having at least one rotationally asymmetric surface.

In this case, said at least one rotationally asymmetric surface may be defined by a continuous surface.

If the second optical element is decentered by rotation with respect to the first optical element, it is then possible to vary at least one of the focal length, image-formation position (focus), image-formation magnification and principal point of the optical system.

According to a specific preferred embodiment of the invention, there is provided an optical system comprising at least two optical elements, each having a rotationally asymmetric free-form surface, or a first optical element located on the object side of the optical system for forming a primary image and a second element for projecting the primary image, wherein the second optical element is decentered with the center of rotation defined by the vicinity of the primary image so that a light beam incident on the second optical element is reflected and bent at an arbitrarily selected central portion of the second optical element for zooming (scaling) at the second optical element, and the second optical element has an angle θ of rotation run-out that satisfies the following condition:

$$0° < \theta < 90° \quad (1)$$

Preferably in this embodiment, the optical system should satisfy the following condition:

$$0.5 < |Fy/Fx| < 2 \quad (2)$$

Here Fx is the focal length of the optical system in an X direction and Fy is the focal length of the optical system in a Y direction provided that the direction of decentration of the optical system defines a Y-axis direction, a plane parallel with an axial chief ray defines a Y-Z plane and a direction perpendicular to the Y-Z plane defines the X-direction.

Why the aforesaid arrangements are used in the invention, and what is achieved thereby is now explained.

FIG. 1 is a schematic view illustrative of how light rays behave in a meridional section of an optical element S at which some large coma occurs with substantially well corrected spherical aberration, curvature of field, astigmatism, longitudinal chromatic aberration and chromatic aberration of magnification. With some considerable coma occurring, rays ①, ② and ③ emanating at different angles of view from an object O are incident on an image plane I at different positions. Accordingly, as aperture positions $P_1$, $P_2$ and $P_3$ of this optical element S displace substantially vertically with respect to an optical axis (note that an optical axis is defined by an axial principal ray passing through the center of an entrance pupil and arriving at the center of the image plane; however, the optical axis used herein is defined by an axial principal ray passing through the center of each aperture $P_1$, $P_2$, $P_3$ and arriving at the center of the image plane), the rays ①, ② and ③ passing through the optical element S vary in position and angle, so that they are incident on the image plane I at different heights $H_1$, $H_2$ and $H_3$. Consequently, the image-formation magnification of the object O on the image plane I varies. In other words, zooming (scaling) can be effected by shifting each aperture substantially vertically to the optical axis. On the same principles, the image-formation position and principal point, too, can be controlled by shifting the pupil position substantially vertically to the optical axis. It is here noted that since the aperture positions are displaceable vertically to the direction coming out of the paper, for instance, zooming (scaling) may be carried out by displacement within the plane of the paper and focusing may be effected by displacement in the direction coming out of the paper.

As an optical system having at least two optical elements $S_1$ and $S_2$ as typically shown in FIG. 2(a) is decentered as shown in FIG. 2(b), an aperture A located on the object side of the first optical element $S_1$ is projected by the first optical element $S_1$ as an aperture image A' in the vicinity of the second optical element. Then, as the first and second optical elements $S_1$ and $S_2$ are relatively transformed (decentered), the projected image A' for the aperture A projected by the first optical element $S_1$ is shifted with respect to the second optical element $S_2$. On the other hand, it is possible to construct the second optical element $S_2$ with at least one rotationally asymmetric optical surface; it is possible to construct an optical element whose power varies on an arbitrary portion of that optical surface. By using at least one such optical element and shifting at least two optical elements relatively thereby bending the optical axis, it is possible to vary at least one paraxial amount out of the focal length, image-formation position, image-formation magnification, principal point position, etc.

More preferably, the rotationally asymmetric optical surface should be in a continuous form, because the aforesaid optical amount can be varied continuously. Of course, if the rotationally asymmetric optical surface is in a discontinuous form, then the aforesaid optical amount can be varied discontinuously.

In FIG. 2, the first optical element $S_1$ is used as the optical element for forming a primary image I' and the second optical element $S_2$ is designed as a variable projection magnification optical element. Even more preferably, however, the first optical element $S_1$ is designed as a variable focal length optical element so that the size of the primary image I' is variable, thereby projecting this primary image I' by the second optical element $S_2$ onto the image plane I at the same magnification. Moreover, both the groups can be separately varied.

In FIG. 2, the first optical element $S_1$ is fixed and the second optical element $S_2$ is decentered. However, it is noted that the reverse also holds true. In the present invention, the relative decentration of both the elements is thus of importance.

Even more preferably, the second optical element $S_2$ should be rotated around the vicinity of the primary image I', because the image plane I can be rotated together with the second optical element $S_2$, so that the arrangement of the optical system can be much more simplified.

It is also acceptable that the second optical element is kept from rotation around the primary image I'. In other words, when the image position is displaced, it is possible to make correction for the center of the image by shifting an image pickup device, photographic film or the like in alignment with the displaced image position.

In FIG. 2, the primary image I' is located between the first optical element $S_1$ and the second optical element $S_2$; however, it may be located at an arbitrary position rather than between the first optical element $S_1$ and the second optical element $S_2$. In this case, too, it is of importance to locate the second optical element at that position by rotation around the primary image I' formed by the first optical element $S_1$.

When the primary image I' is located at infinity, it is preferable to translate the second optical element $S_2$.

More preferably, decentration should be carried out three-dimensionally, so that zooming (scaling) can be by decentration in one plane and focusing by decentration in a plane perpendicular thereto.

While, for the sake of convenience, the first and second optical elements $S_1$ and $S_2$ have been described as being separate from each other, it is understood that the first and second optical elements $S_1$ and $S_2$, if they have the same action, may be formed of a transparent elastomer material as one piece.

The arrangement (optical element or system) designed to enable at least one of focal length, image-formation position, image-formation magnification and principal point position to be controlled by the relative transformation (decentration) of the first and second optical elements $S_1$ and $S_2$, as described above, may be applied to those such as refractive optical systems, reflective optical systems and reflective/refractive optical systems, each having at least one continuous, rotationally asymmetric surface.

Typically, a free-form surface, as defined by the following defining equation (a), is used as the rotationally asymmetric surface. In this defining equation, the Z axis defines the axis of the free-form surface.

$$Z = cr^2 / \left[1 + \sqrt{\{1 - (1+k)c^2 r^2\}}\right] + \sum_{j=2}^{66} C_j X^m Y^n \qquad (a)$$

Here the first term of equation (a) is a spherical term and the second term is a free-form surface term.

In the spherical term:
c: the curvature of the apex,
k: the conic constant, and
$r = \sqrt{(X^2 + Y^2)}$ The free-form surface term is:

$$\sum_{j=2}^{66} C_j X^m Y^n = C_2 X + C_3 Y + C_4 X^2 + C_5 XY + C_6 Y^2 +$$
$$C_7 X^3 + C_8 X^2 Y + C_9 XY^2 + C_{10} Y^3 + C_{11} X^4 + C_{12} X^3 Y +$$
$$C_{13} X^2 Y^2 + C_{14} XY^3 + C_{15} Y^4 + C_{16} X^5 + C_{17} X^4 Y + C_{18} X^3 Y^2 +$$
$$C_{19} X^2 Y^3 + C_{20} XY^4 + C_{21} Y^5 + C_{22} X^6 + C_{23} X^5 Y + C_{24} X^4 Y^2 +$$
$$C_{25} X^3 Y^3 + C_{26} X^2 Y^4 + C_{27} XY^5 + C_{28} Y^6 + C_{29} X^7 + C_{30} X^6 Y +$$
$$C_{31} X^5 Y^2 + C_{32} X^4 Y^3 + C_{33} X^3 Y^4 + C_{34} X^2 Y^5 + C_{35} XY^6 + C_{36} Y^7$$

Here $C_j$ is an integer of 2 or greater) is a coefficient.

In general, the aforesaid free-form surface has no symmetric surface at both the X-Z plane and the Y-Z plane. However, by reducing all the odd-numbered terms for X to zero, that free-form surface can have only one symmetric surface parallel with the Y-Z plane. By reducing all the odd-numbered terms for Y to zero, the free-form surface can have only one symmetric surface parallel with the X-Z plane.

Among the defining formulas for other free-form surface, there is Zernike polynomial given by the following formula (b). The shape of this surface is given by the following formula. The axis for Zernike polynomial is given by the Z axis for the defining formula. The rotationally asymmetric surface is defined by polar coordinates for the height of the Z axis with respect to the X-Y plane provided that R is the distance from the Z axis within the X-Y plane and A is the azimuth angle around the Z axis, as expressed by the angle of rotation measured from the X-axis.

$x = R \times \cos(A)$ i $y = R \times \sin(A)$ i $Z = D_2$ $+ D_3 R \cos(A) + D_4 R \sin(A)$ $+ D_5 R^2 \cos(2A) + D_6(R^2 - 1) + D_7 R^2 \sin(2A)$ $+ D_8 R^3 \cos(3A) + D_9(3R^3 - 2R)\cos(A)$ $+ D_{10}(3R^3 - 2R)\sin(A) + D_{11} R^3 \sin(3A) + D_{12} R^4 \cos(4A) + D_{13}(4R^4 - 3R^2)\cos(2A)$ $+ D_{14}(6R^4 - 6R^2 + 1) + D_{15}(4R^4 - 3R^2)\sin(2A)$ $+ D_{16} R^4 \sin(4A) + D_{17} R^5 \cos(5A) + D_{18}(5R^5 - 4R^3)\cos(3A)$ $+ D_{19}(10R^5 - 12R^3 + 3R)\cos(A)$ $+ D_{20}(10R^5 - 12R^3 + 3R)\sin(A)$ $+ D_{21}(5R^5 - 4R^3)\sin(3A) + D_{22} R^5 \sin(5A) + D_{23} R^5 \cos(6A) + D_{24}(6R^6 - 5R^4)\cos(4A)$ $+ D_{25}(15R^6 - 20R^4 + 6R^2)\cos(2A)$ $+ D_{26}(20R - 30R^4 + 12R^2 - 1)$ $+ D_{27}(15R^6 - 20R^4 + 6R^2)\sin(2A)$ $+ D_{28}(6R^6 - 5R^4)\sin(4A) + D_{29} R^6 \sin(6A)$   (b)

Here Dm is a coefficient provided that m is an integer of 2 or more. It is noted that when this free-form surface is designed in the form of an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$, . . . are used.

While the aforesaid defining formula is given to exemplify the surface of a rotationally asymmetric, curved surface, it is understood that even with any other defining formula the same effect would be obtainable.

Among other defining formulae for the free-form surface, there is the following one (c):

$Z = \Sigma \Sigma C_{nm} XY$

When expanded with respect to k=7 (the seventh term) as an example, this may be expressed by the following formula:

$Z = C_2$ $+ C_3 Y + C_4 |X|$ $+ C_5 Y^2 + C_6 Y|X| + C_7 X^2$ $+ C_8 Y^3 + C_9 Y^2 |X| + C_{10} YX^2 + C_{11} |X^3|$ $+ C_{12} Y^4 + C_{13} Y^3 |X| + C_{14} Y^2 X^2 + C_{15} Y|X^3| + C_{16} X^4$ $+ C_{17} Y^5 + C_{18} Y^4 |X| + C_{19} Y^3 X^2 + Y_{20} Y^2 |X^3| C_{21} YX^4 + C_{22} |X^5|$ $+ C_{23} Y^6 + C_{24} Y^5 |X| + C_{25} Y^4 X^2 + C_{26} Y^3 |X^3| + C_{27} Y^2 X^4 + C_{28} Y|X^5| + C_{29} X^6$ $+ C_{30} Y^7 + C_{31} Y^6 |X| + C_{32} Y^5 X^2 + C_{33} Y^4 |X^3|$ $+ C_{34} Y^3 X^4 + C_{35} Y^2 |X^5| + C_{36} YX^6 + C_{37} |X^7|$   (c)

It is noted that anamorphic or toric surfaces may be used as rotationally asymmetric surfaces.

In the optical element and optical system of the invention, powers Px and Py are defined by incidence of a parallel light ray spaced slightly away from the axial principal ray with respect to light rays in two directions in any orthogonal Y-Z and X-Z planes including the optical axis, as taught in JP-A 11-194267, paragraph The Fy/Fx ratio is determined from the focal lengths Fx and Fy that are the reciprocals of the powers.

As exemplified in Examples 1 to 5 given later, the optical system of the invention is made up of two optical elements, each formed of a rotationally asymmetric free-form surface. A first optical element is located on the object side of the optical system to form a primary image and a second optical element is provided to project the primary image. The second optical element is decentered with the center of rotation defined by the vicinity of the primary image, so that a light beam incident on the second optical element is reflected and bent at a portion arbitrarily selected out of the second optical element for zooming (scaling) at the second optical element. Preferably in this case, the angle θ of rotation run-out of the second optical element should satisfy the following condition (1):

$0° < \theta < 90°$   (1)

When the lower limit of 0° to this condition is not reached, the selection of the optical path per se is impossible to make and, hence, it is impossible to vary the optical parameters. Exceeding the upper limit of 90° is not preferable because the size of the second optical element becomes large.

It is then of great importance to satisfy the following condition (1—1):

$10° < \theta < 45°$   (1—1)

When the lower limit of 10° not reached, partial power changes in the continuous, rotationally asymmetric surface used in the second optical element become noticeable, leading to a failure in achieving satisfactory aberration states all over the screen. Exceeding the upper limit of 45° is not preferable because of an increase in the size of the second optical element.

Here let the direction of decentration of the optical system represent the Y-axis direction, a plane parallel with an axial principal ray denote the Y-Z plane, a direction perpendicular to the Y-Z plane stand for an X direction, and Fx and Fy indicate the focal lengths of the optical system in the X and Y directions. Then, it is important to satisfy the following condition (2):

$0.5 < |Fy/Fx| < 2$   (2)

Upon the lower limit of 0.5 to this condition not being reached, the focal length becomes too long in the X direction relative to the Y direction, so that an image in the X direction becomes too large upon image-formation, resulting in a transversely oblong image. When the upper limit of 2 is exceeded, on the other hand, the focal length becomes too short in the X direction relative to the Y direction, so that an image in the X direction becomes too small, resulting in a longitudinally oblong image.

For an optical system whose focal length is variable as contemplated herein, it is of vital importance to satisfy the aforesaid condition (2) even where the focal length is varying. Unless the aforesaid condition (2) is satisfied in all states where the optical system is placed at the wide-angle to telephoto end or focused on a point at infinity to a nearby point, image distortion changes become unnatural during zooming (scaling) or focusing, resulting in a very difficult-to-observe image.

More preferably, it is of importance to meet the following condition (2-1):

$$0.7 < |Fy/Fx| < 1.3 \tag{2-1}$$

The same as in condition (2) is true for the upper and lower limits.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 6(a), 6(b) and 6(c) are sectional views of the scaling optical system of Example 4 of the invention at its wide-angle end (a), in its standard state (b) and at its telephoto end (c), respectively.

FIGS. 17(a), 17(b) and 17(c) are illustrative of an exemplary box type camera using an optical system comprising two decentered prisms according to the invention.

DESCRIPTION OF THE PREFERRED EMBODIMENTS

Specific examples of the optical system of the invention are now explained, with the constituent parameters for Examples 1 to 5 given later.

Figure 1:
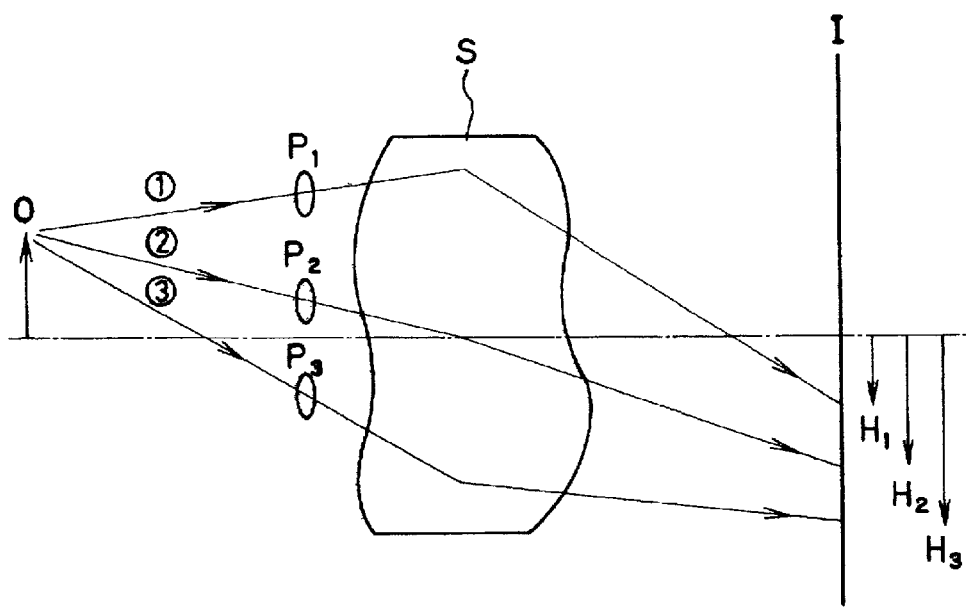
FIG. 1 is illustrative of why zooming, scaling or the like is feasible in the optical system of the invention.
Figure 2A:
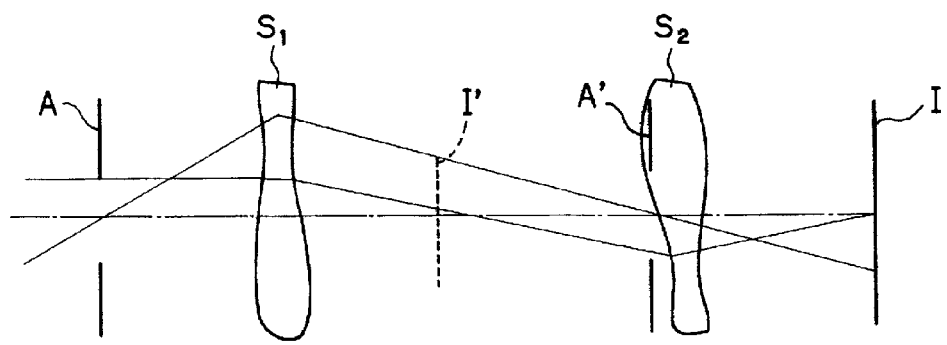
FIGS. 2(a) and 2(b) are illustrative of why scaling or the like is feasible by constructing an optical system using two optical elements in a mutually decentered manner according to the invention.
Figure 2B:
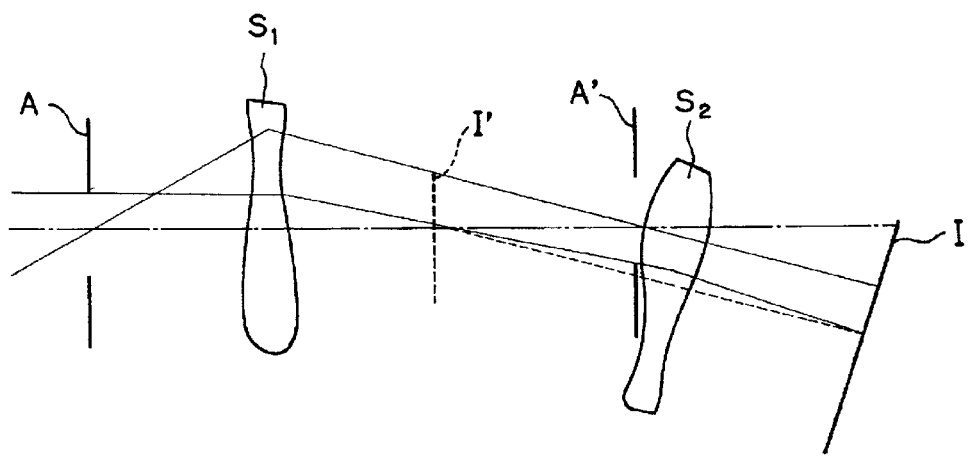
Figure 3A:
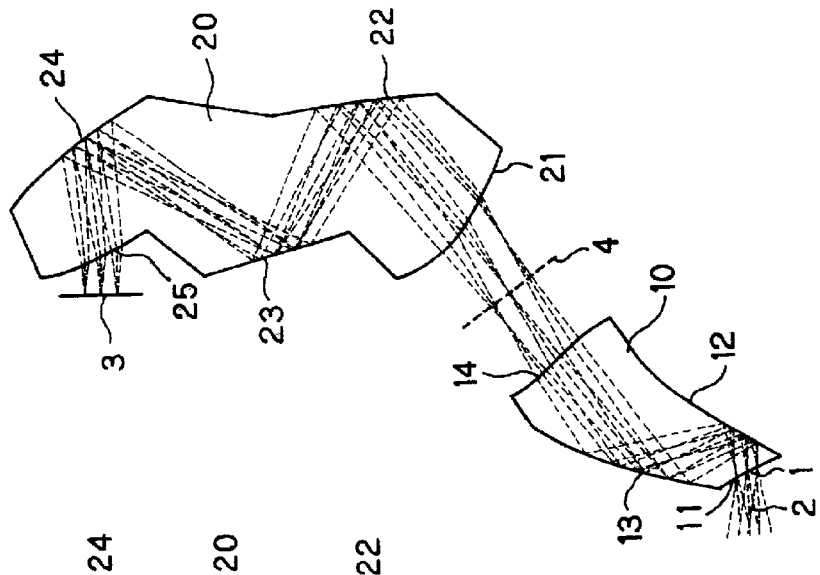
FIGS. 3(a), 3(b) and 3(c) are sectional views of the scaling optical system of Example 1 of the invention at its wide-angle end (a), in its standard state (b) and at its telephoto end (c), respectively.

Referring to the coordinate system used herein, an axial principal ray 2 is defined by a light ray passing vertically through the center of an entrance pupil (stop surface) 1 of an optical system and arriving at the center of an image plane 3, as found by forward ray tracing as shown in FIG. 3(a). In forward ray tracing, the center of the entrance pupil 1 is defined as the origin of a decentration optical surface in a decenteration optical system, a direction along the axial principal ray 2 as the Z-axis direction, a direction from the pupil 1 toward a first surface 11 of a first optical element 10 in the optical system as the Z-axis positive direction, the surface of the paper as the Y-Z plane, a direction that passes through the origin and intersects at right angles with the Y-Z plane and directs from the front to the back side of the paper as the X-axis positive direction, and an axis that forms a right-handed orthogonal coordinate system with the X- and Y-axes as the Y-axis.

For the decentered surfaces (1st to 5th surfaces) of the first optical element 10 and the intermediate image plane (6th surface) that defines the center of rotation of a second optical element 20, the amounts of decentration of the apex positions thereof from the center of the origin of the optical system (X, Y and Z in the X-, Y- and Z-axis directions, respectively) and the angles of tilt of the center axes thereof (the Z-axis in the aforesaid formula (a) for a free-form surface) with respect to the X-, Y- and Z-axes, respectively ($\alpha$, $\beta$, $\gamma$ (°)) are given. In this case, positive $\alpha$ and $\beta$ mean counterclockwise rotation of the respective axes with respect to the positive direction thereof and positive y means clockwise rotation of the Z-axis with respect to the positive direction thereof. Referring to how to rotate the center axis of a surface by $\alpha$, $\beta$ and $\gamma$, the center axis of the surface and its XYZ orthogonal coordinate system are first rotated by a counterclockwise around the X-axis. Then, the center axis of the thus rotated surface is rotated by $\beta$ counterclockwise around the Y-axis of another coordinate system while the once rotated coordinate system is rotated by $\beta$ counterclockwise around the Y-axis. Then, the center axis of the twice rotated surface is rotated by $\gamma$ clockwise around the Z-axis of yet another coordinate system.

For the second optical element 20 and image plane 3, the amounts of decentration are likewise given on the basis of the intermediate plane (6th surface) that defines the center of rotation of the second optical element 20.

It is noted that when, out of optical acting surfaces defining the optical system of each example, a specific surface and the subsequent surface form together a coaxial optical system, the spacing therebetween is given, and the refractive indices and Abbe's numbers of the media used are listed as conventional.

The shape of the free-form surface used herein is defined by the aforesaid equation (a) and the Z-axis of that defining equation gives the axis of the free-form surface.

It is also noted that the term regarding the free-form surfaces and aspheric surfaces on which no data are given is zero. The index of refraction is given on the basis of d-line (of 587.56 nm wavelength), and length is given in mm.

Enumerated below are the dimensions, entrance pupil diameter, angle of view, focal length and F-number of the image pickup device used in each example. The focal length and F-number were calculated from the horizontal angle of view and image height.

In Examples 1 to 5, an image pickup device of 3.2×2.4 mm was used with an entrance pupil diameter of 1.15 mm.

EXAMPLE 1

|  | Telephoto End | Standard State | Wide-Angle End |
|---|---|---|---|
| Vertical Half-Angle of View | 20.34 | 14.55 | 10.50 (°) |
| Horizontal Half-Angle of View | 26.31 | 19.09 | 13.89 (°) |
| Focal Length | 3.24 | 4.62 | 6.47 (mm) |
| F-Number | 2.82 | 4.02 | 5.63 |

EXAMPLES 2–3

|  | Telephoto End | Standard State | Wide-Angle End |
|---|---|---|---|
| Vertical Half-Angle of View | 18.31 | 13.10 | 9.45 (°) |
| Horizontal Half-Angle of View | 23.68 | 17.18 | 12.50 (°) |
| Focal Length | 3.65 | 5.18 | 7.22 (mm) |
| F-Number | 3.17 | 4.50 | 6.28 |

EXAMPLE 4

|  | Telephoto End | Standard State | Wide-Angle End |
|---|---|---|---|
| Vertical Half-Angle of View | 18.31 | 13.10 | 9.45 (°) |
| Horizontal Half-Angle of View | 23.68 | 17.18 | 12.50 (°) |
| Focal Length | 3.64 | 5.18 | 7.22 (mm) |
| F-Number | 3.17 | 4.50 | 6.28 |

EXAMPLE 5

|  | Telephoto End | Standard State | Wide-Angle End |
|---|---|---|---|
| Vertical Half-Angle of View | 20.34 | 10.50 | 7.05 (°) |
| Horizontal Half-Angle of View | 26.31 | 13.89 | 9.36 (°) |
| Focal Length | 3.24 | 6.47 | 9.71 (mm) |
| F-Number | 2.95 | 5.63 | 8.44 |

Listed below are the angles θ of rotation run-out of the second optical elements in Examples 1 to 5.

Example 1 24.747°
Example 2 10.400°
Example 3 20.000°
Example 4 22.569°
Example 5 34.477°

Set out below are the focal length Fy (mm) of the optical system in the decentration direction, the focal length Fx (mm) thereof in a direction perpendicular to the decentraiton direction, and the Fy/Fx ratio.

|  |  | Telephoto End | Standard State | Wide-Angle End |
|---|---|---|---|---|
| Example 1 | Fx | 3.138 | 3.867 | 4.630 |
|  | Fy | 3.102 | 4.075 | 4.943 |
| Example 2 | Fx | 4.019 | 5.522 | 7.194 |
|  | Fy | 3.682 | 5.522 | 6.835 |
| Example 3 | Fx | 4.769 | 5.790 | 7.097 |
|  | Fy | 3.782 | 5.368 | 6.532 |
| Example 4 | Fx | 3.467 | 4.857 | 6.211 |
|  | Fy | 3.482 | 5.010 | 6.832 |
| Example 5 | Fx | 3.481 | 6.645 | 9.785 |
|  | Fy | 3.659 | 6.200 | 8.718 |
| Example 1 | Fy/Fx | 0.989 | 1.054 | 1.068 |
| Example 2 | Fy/Fx | 0.916 | 1.000 | 0.950 |
| Example 3 | Fy/Fx | 0.793 | 0.927 | 0.920 |
| Example 4 | Fy/Fx | 1.044 | 1.032 | 1.100 |
| Example 5 | Fy/Fx | 1.051 | 1.032 | 0.891 |

EXAMPLE 1

Figure 3B:
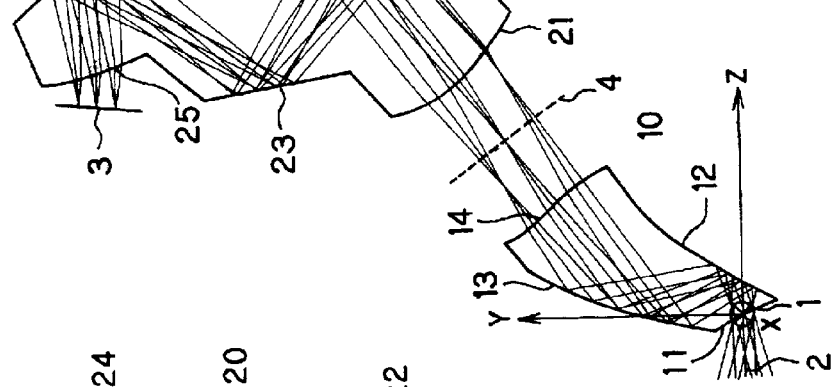
Figure 3C:
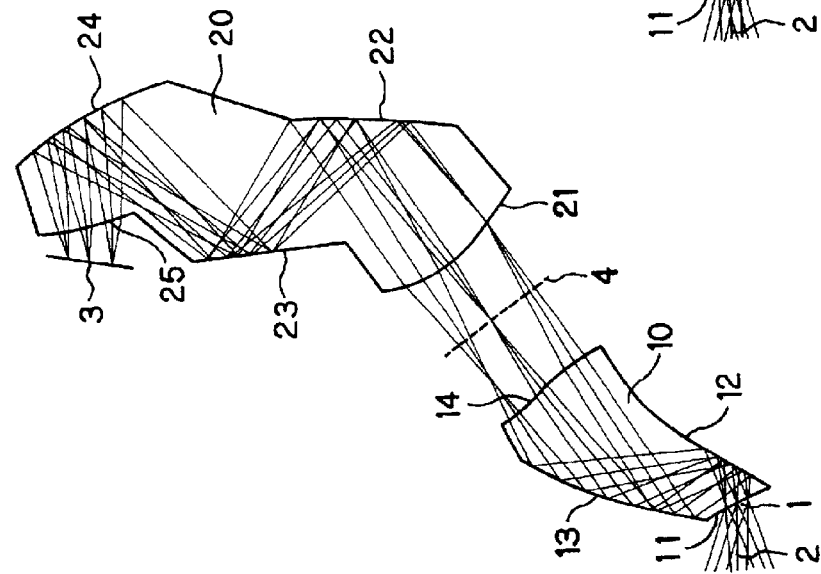

The zooming or scaling optical system according to this example is made up of two decentration prisms 10 and 20, each formed of rotationally asymmetric free-form surfaces, as shown in FIGS. 3(*a*), 3(*b*) and 3(*c*) that are the sectional views thereof at the wide-angle end (a), in the standard state (b) and at the telephoto end (c). That is, the optical system is composed of a first decentration prism 10 located on the object side of the optical system for forming a primary image on an intermediate image plane 4 and a second decentration prism 20 for projecting that primary image. The second prism 20 is decentered with the center of rotation defined by the vicinity of the primary image, so that a light beam incident from the first decentration prism 10 on the second decentration prism 20 is reflected and bent at a portion arbitrarily selected out of the second decentration prism 20 for zooming or scaling by the second decentration prism 20.

More specifically, the optical system of this example is made up of a stop 1 located on the entrance side thereof, a first decentration prism 10 located on the exit side thereof and consisting of a first surface 11 for entering a light beam passing through the stop 1 into the prism, a second surface 12 for reflecting a light beam entered into the prism via the first surface 11, a third surface 13 for reflecting a light beam reflected at the second surface 12 and a fourth surface 14 for allowing a light beam reflected at the third surface 13 to leave the prism, a second decentration prism 20 consisting of a first surface 21 for entering into the prism a light leaving the first decentration prism 10 to form a primary image on an intermediate image plane 4, a second surface 22 for reflecting a light beam entered into the prism via the first surface 21, a third surface 23 for reflecting a light beam reflected at the second surface 22, a fourth surface 24 for reflecting a light beam reflected at the third surface 23 and a fifth surface 25 for allowing a light beam reflected at the fourth surface 24 to leave the prism, and an image plane 3. In both the first decentration prism 10 and the second decentration prism 20, the optical path takes a zigzag path form with the optical axis not crossing over itself.

In this example, the 1st to 4th surfaces 11 to 14 of the first decentration prism 10 and the 1st to 5th surfaces 21 to 25 of the second decentration prism 20 are all formed of rotationally asymmetric free-form surfaces.

Example 2

Figure 4A:
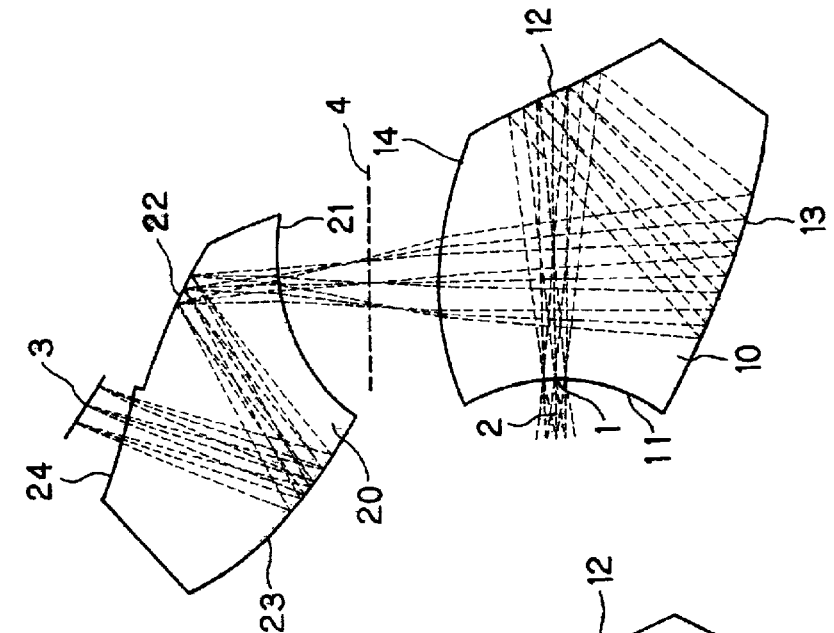
FIGS. 4(a), 4(b) and 4(c) are sectional views of the scaling optical system of Example 2 of the invention at its wide-angle end (a), in its standard state (b) and at its telephoto end (c), respectively.
Figure 4B:
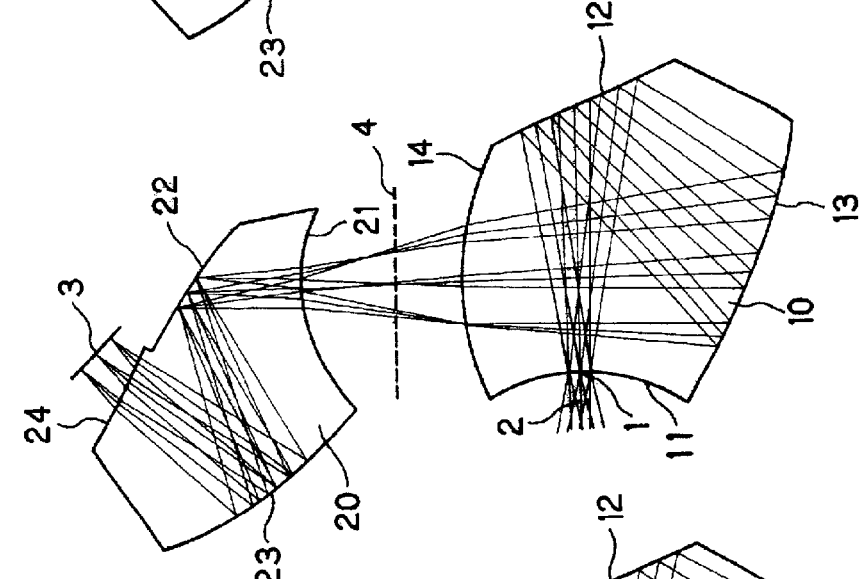
Figure 4C:
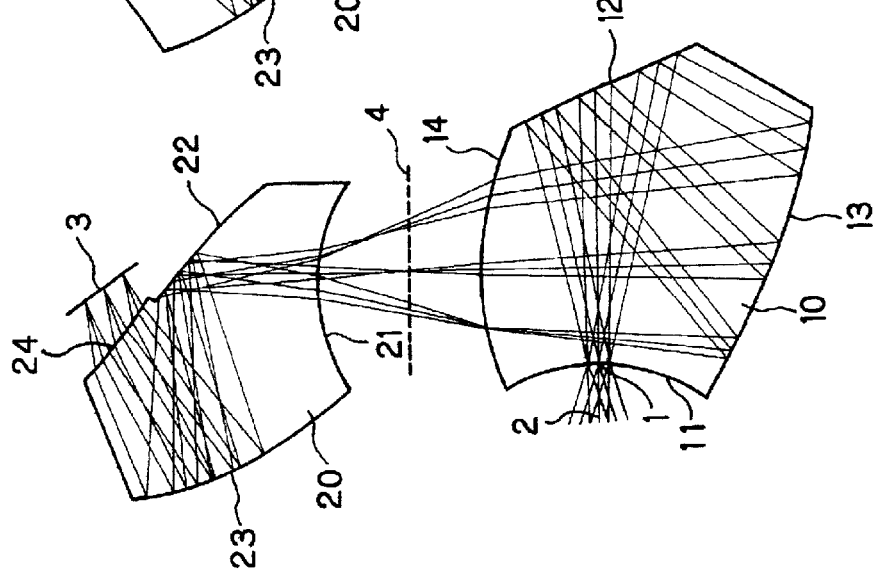

The zooming or scaling optical system according to this example, is made up of two decentration prisms 10 and 20, each formed of rotationally asymmetric free-form surfaces, as shown in FIGS. 4(a), 4(b) and 4(c) that are the sectional views thereof at the wide-angle end (a), in the standard state (b) and at the telephoto end (c). That is, the optical system is composed of a first decentration prism 10 located on the object side of the optical system for forming a primary image on an intermediate image plane 4 and a second decentration prism 20 for projecting that primary image. The second prism 20 is decentered with the center of rotation defined by the vicinity of the primary image, so that a light beam incident from the first decentration prism 10 on the second decentration prism 20 is reflected and bent at a portion arbitrarily selected out of the second decentration prism 20 for zooming or scaling by the second decentration prism 20.

More specifically, the optical system of this example is made up of a stop 1 located on the entrance side of the optical system, a first decentration prism 10 located on the exit side thereof and consisting of a first surface 11 for entering a light beam passing through the stop 11 into the prism, a second surface 12 for reflecting a light beam entered into the prism via the first surface 11, a third surface 13 for reflecting a light beam reflected at the second surface 12 and a fourth surface 14 for allowing a light beam reflected at the third surface 13 to leave the prism, a second decentration prism 20 consisting of a first surface 21 for entering into the prism a light beam leaving the first decentration prism 10 to form a primary image on an intermediate image plane 4, a second surface 22 for reflecting a light beam entered into the prism via the first surface 21, a third surface 23 for reflecting a light beam reflected at the second surface 22 and a fourth surface 24 for permitting a light beam reflected at the third surface 23 to leave the prism, and an image plane 3. In the first decentration prism 10 the optical path takes a rotation path form with the optical axis crossing over itself, and in the second decentration prism 20 the optical path assumes a zigzag path form with the optical axis not crossing over itself.

In this example, the 1st to 4th surfaces 11 to 14 of the first decentration prism 10 and the 1st to 4th surfaces 21 to 24 of the second decentration prism 20 are all formed of rotationally asymmetric free-form surfaces.

EXAMPLES 3 to 5

The zooming or scaling optical system according to each example, is made up of two decentration prisms 10 and 20, each formed of rotationally asymmetric free-form surfaces, as shown in FIGS. 5–7(a), 5–7(b) and 5–7(c) that are the sectional views thereof at the wide-angle end (a), in the standard state (b) and at the telephoto end (c). That is, the optical system is composed of a first decentration prism 10 located on the object side of the optical system for forming a primary image on an intermediate image plane 4 and a second decentration prism 20 for projecting that primary image. The second prism 20 is decentered with the center of rotation defined by the vicinity of the primary image, so that a light beam incident from the first decentration prism 10 on the second decentration prism 20 is reflected and bent at a portion arbitrarily selected out of the second decentration prism 20 for zooming or scaling by the second decentration prism 20.

More specifically, each optical system is made up of a stop 1 located on the entrance side of the optical system, a first decentration prism 10 consisting of a first surface 11 for entering a light beam passing through the stop 1 into the prism, a second surface 12 for reflecting a light beam entered into the prism via the first surface 11, a third surface 13 for reflecting a light beam reflected at the second surface 12 and a fourth surface 14 for permitting a light beam reflected at the third surface 13 to leave the prism, a second decentration prism 20 consisting of a first surface 21 for entering into the prism a light beam leaving the first decentration prism to form a primary image on an intermediate image plane 4, a second surface 22 for reflecting a light beam entered into the prism via the first surface 21, a third surface 23 for reflecting a light beam reflected at the second surface 22 and a fourth surface 24 for permitting a light beam reflected at the third surface 23 to leave the prism, and an image plane 3. In both the first decentration prism 10 and the second decentration prism 20, the optical path takes a rotation path form with the optical axis crossing over itself.

In each example, the 1st to 4th surfaces 11 to 14 of the first decentration prism 10 and the 1st to 4th surfaces 21 to 24 of the second decentration prism 20 are all formed of rotationally asymmetric free-form surfaces.

Given below are the constituent parameters for Examples 1 to 5. It is noted that "FFS", "RE", and "IMP" stand for a free-form surface, a reflecting surface, and an intermediate image plane, respectively, and that "W", "S", and "T" inserted after α in the column "decentration" represent the wide-angle end, standard state, and telephoto end, respectively, and the values of α in those states are given.

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | F F S ① | | (1) | 1.4924 | 57.6 |
| 3 | F F S ② (RE) | | (2) | 1.4924 | 57.6 |
| 4 | F F S ③ (RE) | | (3) | 1.4924 | 57.6 |
| 5 | F F S ④ | | (4) | | |
| 6 | ∞ (IMP) | | (5) | | |
| 7 | F F S ⑤ | | (6) | 1.4924 | 57.6 |
| 8 | F F S ⑥ (RE) | | (7) | 1.4924 | 57.6 |
| 9 | F F S ⑦ (RE) | | (8) | 1.4924 | 57.6 |
| 10 | F F S ⑧ (RE) | | (9) | 1.4924 | 57.6 |
| 11 | F F S ⑨ | | (10) | | |
| Image plane | ∞ | | (11) | | |

F F S ①

$C_4$   $-2.8093 \times 10^{-2}$   $C_6$   $-3.4693 \times 10^{-2}$   $C_8$   $-1.0960 \times 10^{-2}$
$C_{10}$   $8.5100 \times 10^{-5}$

F F S ②

$C_4$   $1.6602 \times 10^{-2}$   $C_6$   $2.2602 \times 10^{-3}$   $C_8$   $2.1554 \times 10^{-3}$
$C_{10}$   $6.3634 \times 10^{-4}$   $C_{11}$   $-3.9065 \times 10^{-4}$   $C_{13}$   $6.3413 \times 10^{-4}$
$C_{15}$   $9.2512 \times 10^{-5}$   $C_{17}$   $-4.9786 \times 10^{-4}$   $C_{19}$   $-1.2226 \times 10^{-4}$
$C_{21}$   $9.1178 \times 10^{-6}$

F F S ③

$C_4$   $3.9966 \times 10^{-2}$   $C_6$   $1.4198 \times 10^{-2}$   $C_8$   $1.0166 \times 10^{-3}$
$C_{10}$   $4.7035 \times 10^{-4}$   $C_{11}$   $-4.9685 \times 10^{-5}$   $C_{13}$   $-8.3524 \times 10^{-5}$
$C_{15}$   $1.0200 \times 10^{-5}$   $C_{17}$   $1.2847 \times 10^{-5}$   $C_{19}$   $5.8590 \times 10^{-6}$
$C_{21}$   $2.6248 \times 10^{-6}$

F F S ④

$C_4$   $3.3696 \times 10^{-3}$   $C_6$   $-1.3272 \times 10^{-2}$   $C_8$   $-3.7242 \times 10^{-3}$
$C_{10}$   $8.3035 \times 10^{-3}$   $C_{11}$   $-3.1336 \times 10^{-4}$   $C_{13}$   $-2.5688 \times 10^{-4}$
$C_{15}$   $1.1044 \times 10^{-3}$   $C_{17}$   $1.0729 \times 10^{-4}$   $C_{19}$   $9.6682 \times 10^{-5}$
$C_{21}$   $1.0731 \times 10^{-4}$ -continued

FFS⑤

| | | | | | | |
|---|---|---|---|---|---|---|
| $C_4$ | $-8.1845 \times 10^{-2}$ | $C_6$ | $-4.3366 \times 10^{-2}$ | $C_8$ | $-1.5077 \times 10^{-3}$ |
| $C_{10}$ | $-4.0125 \times 10^{-3}$ | $C_{11}$ | $1.4399 \times 10^{-4}$ | $C_{13}$ | $-4.5269 \times 10^{-4}$ |
| $C_{15}$ | $-2.4801 \times 10^{-4}$ | $C_{17}$ | $3.4441 \times 10^{-5}$ | $C_{19}$ | $9.1968 \times 10^{-5}$ |
| $C_{21}$ | $1.3382 \times 10^{-6}$ | | | | |

FFS⑥

| | | | | | | |
|---|---|---|---|---|---|---|
| $C_4$ | $1.4370 \times 10^{-2}$ | $C_6$ | $1.0450 \times 10^{-2}$ | $C_8$ | $1.3843 \times 10^{-3}$ |
| $C_{10}$ | $7.2299 \times 10^{-5}$ | $C_{11}$ | $1.9307 \times 10^{-6}$ | $C_{13}$ | $-1.4921 \times 10^{-4}$ |
| $C_{15}$ | $-1.4071 \times 10^{-5}$ | $C_{17}$ | $4.1603 \times 10^{-6}$ | $C_{19}$ | $6.4284 \times 10^{-6}$ |
| $C_{21}$ | $-7.8770 \times 10^{-7}$ | | | | |

FFS⑦

| | | | | | | |
|---|---|---|---|---|---|---|
| $C_4$ | $1.5120 \times 10^{-3}$ | $C_6$ | $-2.9647 \times 10^{-3}$ | $C_8$ | $4.7908 \times 10^{-3}$ |
| $C_{10}$ | $4.9885 \times 10^{-4}$ | $C_{11}$ | $8.4959 \times 10^{-4}$ | $C_{13}$ | $4.3625 \times 10^{-4}$ |
| $C_{15}$ | $4.6589 \times 10^{-5}$ | $C_{17}$ | $2.0374 \times 10^{-4}$ | $C_{19}$ | $4.2066 \times 10^{-5}$ |
| $C_{21}$ | $1.4053 \times 10^{-6}$ | | | | |

FFS⑧

| | | | | | | |
|---|---|---|---|---|---|---|
| $C_4$ | $4.1063 \times 10^{-2}$ | $C_6$ | $2.0688 \times 10^{-2}$ | $C_8$ | $2.1827 \times 10^{-3}$ |
| $C_{10}$ | $1.8263 \times 10^{-3}$ | $C_{11}$ | $7.0118 \times 10^{-5}$ | $C_{13}$ | $6.4898 \times 10^{-5}$ |
| $C_{15}$ | $2.9720 \times 10^{-6}$ | $C_{17}$ | $8.5095 \times 10^{-6}$ | $C_{19}$ | $4.2440 \times 10^{-8}$ |
| $C_{21}$ | $2.6245 \times 10^{-7}$ | | | | |

FFS⑨

| | | | | | | |
|---|---|---|---|---|---|---|
| $C_4$ | $1.0738 \times 10^{-1}$ | $C_6$ | $-2.4596 \times 10^{-2}$ | $C_8$ | $-9.5481 \times 10^{-3}$ |
| $C_{17}$ | $-1.3792 \times 10^{-3}$ | $C_{19}$ | $-4.6896 \times 10^{-4}$ | $C_{21}$ | $-1.1515 \times 10^{-4}$ |

Displacement and tilt(1)

| X | 0.00 | Y | 0.00 | Z | 0.00 |
|---|---|---|---|---|---|
| α | 26.00 | β | 0.00 | γ | 0.00 |

Displacement and tilt(2)

| X | 0.00 | Y | 0.32 | Z | 2.06 |
|---|---|---|---|---|---|
| α | −30.15 | β | 0.00 | γ | 0.00 |

Displacement and tilt(3)

| X | 0.00 | Y | 5.75 | Z | 0.00 |
|---|---|---|---|---|---|
| α | −15.63 | β | 0.00 | γ | 0.00 |

Displacement and tilt(4)

| X | 0.00 | Y | 10.60 | Z | 6.21 |
|---|---|---|---|---|---|
| α | 42.57 | β | 0.00 | γ | 0.00 |

Displacement and tilt(5)

| X | 0.00 | Y | 13.32 | Z | 10.00 |
|---|---|---|---|---|---|
| α | −5.06 | β | 180.00 | γ | 0.00 |

Variable magnification

| αW | −5.06 | αS | 0.00 | αT | 5.34 |
|---|---|---|---|---|---|

Displacement and tilt(6)

| X | 0.00 | Y | 2.12 | Z | −3.59 |
|---|---|---|---|---|---|
| α | −47.43 | β | 0.00 | γ | 0.00 |

Displacement and tilt(7)

| X | 0.00 | Y | 7.33 | Z | −10.69 |
|---|---|---|---|---|---|
| α | −1.05 | β | 0.00 | γ | 0.00 |

Displacement and tilt(8)

| X | 0.00 | Y | 12.48 | Z | −3.11 |
|---|---|---|---|---|---|
| α | −10.15 | β | 0.00 | γ | 0.00 |

Displacement and tilt(9)

| X | 0.00 | Y | 22.47 | Z | −10.24 |
|---|---|---|---|---|---|
| α | −28.65 | β | 0.00 | γ | 0.00 |

Displacement and tilt(10)

| X | 0.00 | Y | 22.16 | Z | −3.97 |
|---|---|---|---|---|---|
| α | −18.09 | β | 0.00 | γ | 0.00 |

Displacement and tilt(11)

| X | 0.00 | Y | 22.34 | Z | −1.98 |
|---|---|---|---|---|---|
| α | 5.06 | β | 0.00 | γ | 0.00 |

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | FFS① | | (1) | 1.4924 | 57.6 |
| 3 | FFS② (RE) | | (2) | 1.4924 | 57.6 |
| 4 | FFS③ (RE) | | (3) | 1.4924 | 57.6 |
| 5 | FFS④ | | (4) | | |
| 6 | ∞ (IMP) | | (5) | | |
| 7 | FFS⑤ | | (6) | 1.4924 | 57.6 |
| 8 | FFS⑥ (RE) | | (7) | 1.4924 | 57.6 |
| 9 | FFS⑦ (RE) | | (8) | 1.4924 | 57.6 |
| 10 | FFS⑧ | | (9) | | |
| Image plane | ∞ | | (10) | | |

FFS①

| | | | |
|---|---|---|---|
| $C_4$ | $-5.7825 \times 10^{-2}$ | $C_6$ | $-5.4362 \times 10^{-2}$ |

FFS②

| | | | | | |
|---|---|---|---|---|---|
| $C_4$ | $2.4082 \times 10^{-3}$ | $C_6$ | $-3.3749 \times 10^{-3}$ | $C_8$ | $-1.4479 \times 10^{-3}$ |
| $C_{10}$ | $-8.1905 \times 10^{-4}$ | | | | |

FFS③

| | | | | | |
|---|---|---|---|---|---|
| $C_4$ | $1.5008 \times 10^{-2}$ | $C_6$ | $1.2174 \times 10^{-2}$ | $C_8$ | $-2.1697 \times 10^{-4}$ |
| $C_{10}$ | $-1.8719 \times 10^{-4}$ | | | | |

FFS④

| | | | |
|---|---|---|---|
| $C_4$ | $-1.8018 \times 10^{-2}$ | $C_6$ | $-2.9453 \times 10^{-2}$ |

FFS⑤

| | | | |
|---|---|---|---|
| $C_4$ | $8.1701 \times 10^{-2}$ | $C_6$ | $-5.3191 \times 10^{-2}$ |

FFS⑥

| | | | | | |
|---|---|---|---|---|---|
| $C_4$ | $-9.7414 \times 10^{-5}$ | $C_6$ | $-1.2070 \times 10^{-2}$ | $C_8$ | $6.4801 \times 10^{-3}$ |
| $C_{10}$ | $9.7166 \times 10^{-4}$ | | | | |

FFS⑦

| | | | | | |
|---|---|---|---|---|---|
| $C_4$ | $3.2443 \times 10^{-2}$ | $C_6$ | $2.1970 \times 10^{-2}$ | $C_8$ | $6.2843 \times 10^{-4}$ |
| $C_{10}$ | $4.6632 \times 10^{-4}$ | | | | |

FFS⑧

| | | | |
|---|---|---|---|
| $C_4$ | $-1.8666 \times 10^{-2}$ | $C_6$ | $1.5607 \times 10^{-2}$ |

Displacement and tilt(1)

| X | 0.00 | Y | 0.00 | Z | 0.00 |
|---|---|---|---|---|---|
| α | 0.00 | β | 0.00 | γ | 0.00 |

Displacement and tilt(2)

| X | 0.00 | Y | 0.00 | Z | 14.97 |
|---|---|---|---|---|---|
| α | 22.50 | β | 0.00 | γ | 0.00 |

Displacement and tilt(3)

| X | 0.00 | Y | −9.67 | Z | 5.30 |
|---|---|---|---|---|---|
| α | 67.50 | β | 0.00 | γ | 0.00 |

Displacement and tilt(4)

| X | 0.00 | Y | 6.26 | Z | 5.30 |
|---|---|---|---|---|---|
| α | 90.00 | β | 0.00 | γ | 0.00 |

Displacement and tilt(5)

| X | 0.00 | Y | 10.00 | Z | 5.30 |
|---|---|---|---|---|---|
| α | 80.00 | β | 0.00 | γ | 0.00 |

Variable magnification

| αW | 80.00 | αS | 90.00 | αT | 100.00 |
|---|---|---|---|---|---|

Displacement and tilt(6)

| X | 0.00 | Y | 0.00 | Z | 5.00 |
|---|---|---|---|---|---|
| α | 2.17 | β | 0.00 | γ | 0.00 |

Displacement and tilt(7)

| X | 0.00 | Y | 0.08 | Z | 11.24 |
|---|---|---|---|---|---|
| α | −33.38 | β | 0.00 | γ | 0.00 |

-continued

Displacement and tilt(8)

| | | | | | |
|---|---|---|---|---|---|
| X | 0.00 | Y | 11.23 | Z | 6.62 |
| α | −52.56 | β | 0.00 | γ | 0.00 |

Displacement and tilt(9)

| | | | | | |
|---|---|---|---|---|---|
| X | 0.00 | Y | 5.09 | Z | 14.57 |
| α | −25.36 | β | 0.00 | γ | 0.00 |

Displacement and tilt(10)

| | | | | | |
|---|---|---|---|---|---|
| X | 0.00 | Y | 3.42 | Z | 16.32 |
| α | −43.84 | β | 0.00 | γ | 0.00 |

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | F F S ① | | (1) | 1.4924 | 57.6 |
| 3 | F F S ② (RE) | | (2) | 1.4924 | 57.6 |
| 4 | F F S ③ (RE) | | (3) | 1.4924 | 57.6 |
| 5 | F F S ④ | | (4) | | |
| 6 | ∞ (IMP) | | (5) | | |
| 7 | F F S ⑤ | | (6) | 1.4924 | 57.6 |
| 8 | F F S ⑥ (RE) | | (7) | 1.4924 | 57.6 |
| 9 | F F S ⑦ (RE) | | (8) | 1.4924 | 57.6 |
| 10 | F F S ⑧ | | (9) | | |
| Image plane | ∞ | | (10) | | |

F F S ①

| $C_4$ | $1.5320 \times 10^{-1}$ | $C_6$ | $-2.1996 \times 10^{-1}$ | | |

F F S ②

| $C_4$ | $1.8216 \times 10^{-2}$ | $C_6$ | $-2.6061 \times 10^{-2}$ | $C_8$ | $2.5274 \times 10^{-3}$ |
| $C_{10}$ | $2.2789 \times 10^{-4}$ | | | | |

F F S ③

| $C_4$ | $2.0578 \times 10^{-2}$ | $C_6$ | $-1.1913 \times 10^{-2}$ | $C_8$ | $-7.1285 \times 10^{-4}$ |
| $C_{10}$ | $5.6967 \times 10^{-4}$ | | | | |

F F S ④

| $C_4$ | $1.6882 \times 10^{-2}$ | $C_6$ | $-9.2842 \times 10^{-2}$ | | |

F F S ⑤

| $C_4$ | $5.9069 \times 10^{-2}$ | $C_6$ | $-2.9893 \times 10^{-4}$ | | |

F F S ⑥

| $C_4$ | $5.1683 \times 10^{-3}$ | $C_6$ | $-1.2134 \times 10^{-2}$ | $C_8$ | $-7.3201 \times 10^{-4}$ |
| $C_{10}$ | $-3.1908 \times 10^{-4}$ | | | | |

F F S ⑦

| $C_4$ | $1.9549 \times 10^{-2}$ | $C_6$ | $1.2856 \times 10^{-2}$ | $C_8$ | $-9.7153 \times 10^{-4}$ |
| $C_{10}$ | $-6.6661 \times 10^{-4}$ | | | | |

F F S ⑧

| $C_4$ | $-8.8129 \times 10^{-2}$ | $C_6$ | $5.8889 \times 10^{-2}$ | | |

Displacement and tilt(1)

| X | 0.00 | Y | 0.00 | Z | 0.00 |
| α | 0.00 | β | 0.00 | γ | 0.00 |

Displacement and tilt(2)

| X | 0.00 | Y | 0.00 | Z | 10.00 |
| α | 22.50 | β | 0.00 | γ | 0.00 |

Displacement and tilt(3)

| X | 0.00 | Y | −6.00 | Z | 4.00 |
| α | 67.50 | β | 0.00 | γ | 0.00 |

-continued

Displacement and tilt(4)

| X | 0.00 | Y | 6.00 | Z | 4.00 |
| α | 90.00 | β | 0.00 | γ | 0.00 |

Displacement and tilt(5)

| X | 0.00 | Y | 10.00 | Z | 4.00 |
| α | 100.00 | β | 0.00 | γ | 0.00 |

Variable magnification

| αW | 100.00 | αS | 90.00 | αT | 74.86 |

Displacement and tilt(6)

| X | 0.00 | Y | 0.00 | Z | 3.33 |
| α | 17.17 | β | 0.00 | γ | 0.00 |

Displacement and tilt(7)

| X | 0.00 | Y | 1.86 | Z | 21.77 |
| α | −9.66 | β | 0.00 | γ | 0.00 |

Displacement and tilt(8)

| X | 0.00 | Y | 7.69 | Z | 9.32 |
| α | −57.53 | β | 0.00 | γ | 0.00 |

Displacement and tilt(9)

| X | 0.00 | Y | −3.66 | Z | 9.33 |
| α | −89.90 | β | 0.00 | γ | 0.00 |

Displacement and tilt(10)

| X | 0.00 | Y | −5.72 | Z | 9.33 |
| α | −90.00 | β | 0.00 | γ | 0.00 |

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | F F S ① | | (1) | 1.5256 | 56.4 |
| 3 | F F S ② (RE) | | (2) | 1.5256 | 56.4 |
| 4 | F F S ③ (RE) | | (3) | 1.5256 | 56.4 |
| 5 | F F S ④ | | (4) | | |
| 6 | ∞ (IMP) | | (5) | | |
| 7 | F F S ⑤ | | (6) | 1.5256 | 56.4 |
| 8 | F F S ⑥ (RE) | | (7) | 1.5256 | 56.4 |
| 9 | F F S ⑦ (RE) | | (8) | 1.5256 | 56.4 |
| 10 | F F S ⑧ | | (9) | | |
| Image plane | ∞ | | (10) | | |

F F S ①

| $C_4$ | $1.4144 \times 10^{-1}$ | $C_6$ | $-1.0418 \times 10^{-1}$ | $C_8$ | $-5.4479 \times 10^{-3}$ |
| $C_{10}$ | $1.7498 \times 10^{-3}$ | $C_{11}$ | $3.3268 \times 10^{-3}$ | $C_{13}$ | $3.3680 \times 10^{-3}$ |
| $C_{15}$ | $2.6872 \times 10^{-4}$ | | | | |

F F S ②

| $C_4$ | $3.2763 \times 10^{-2}$ | $C_6$ | $-2.0049 \times 10^{-2}$ | $C_8$ | $4.0430 \times 10^{-3}$ |
| $C_{10}$ | $-1.7982 \times 10^{-4}$ | $C_{11}$ | $-4.0041 \times 10^{-4}$ | $C_{13}$ | $4.0093 \times 10^{-6}$ |
| $C_{15}$ | $4.5664 \times 10^{-5}$ | $C_{17}$ | $-6.4082 \times 10^{-5}$ | $C_{19}$ | $1.2114 \times 10^{-6}$ |
| $C_{21}$ | $-5.2650 \times 10^{-8}$ | | | | |

F F S ③

| $C_4$ | $2.5494 \times 10^{-2}$ | $C_6$ | $-5.5984 \times 10^{-3}$ | $C_8$ | $-8.9562 \times 10^{-4}$ |
| $C_{10}$ | $-1.2631 \times 10^{-3}$ | $C_{11}$ | $-2.8906 \times 10^{-6}$ | $C_{13}$ | $-3.4442 \times 10^{-5}$ |
| $C_{15}$ | $1.3736 \times 10^{-6}$ | $C_{17}$ | $6.1054 \times 10^{-7}$ | $C_{19}$ | $1.2649 \times 10^{-5}$ |
| $C_{21}$ | $-5.2650 \times 10^{-8}$ | | | | |

F F S ④

| $C_4$ | $1.8276 \times 10^{-2}$ | $C_6$ | $-7.0937 \times 10^{-2}$ | $C_8$ | $-1.0860 \times 10^{-4}$ |
| $C_{10}$ | $-2.7681 \times 10^{-3}$ | $C_{11}$ | $-5.4357 \times 10^{-5}$ | $C_{13}$ | $-1.7414 \times 10^{-4}$ |
| $C_{15}$ | $1.7472 \times 10^{-5}$ | | | | |

-continued

FFS⑤

| | | | | | |
|---|---|---|---|---|---|
| $C_4$ | $3.2818 \times 10^{-2}$ | $C_6$ | $4.7767 \times 10^{-2}$ | $C_8$ | $3.6172 \times 10^{-3}$ |
| $C_{10}$ | $-7.9056 \times 10^{-3}$ | $C_{11}$ | $8.4021 \times 10^{-5}$ | $C_{13}$ | $-2.9835 \times 10^{-4}$ |
| $C_{15}$ | $-2.9355 \times 10^{-6}$ | | | | |

FFS⑥

| | | | | | |
|---|---|---|---|---|---|
| $C_4$ | $1.1455 \times 10^{-2}$ | $C_6$ | $-7.4456 \times 10^{-4}$ | $C_8$ | $-8.3959 \times 10^{-5}$ |
| $C_{10}$ | $-7.4275 \times 10^{-4}$ | $C_{11}$ | $7.8861 \times 10^{-5}$ | $C_{13}$ | $1.3314 \times 10^{-4}$ |
| $C_{15}$ | $5.4210 \times 10^{-5}$ | $C_{17}$ | $2.0248 \times 10^{-5}$ | $C_{19}$ | $4.0478 \times 10^{-6}$ |
| $C_{21}$ | $-5.2650 \times 10^{-8}$ | | | | |

FFS⑦

| | | | | | |
|---|---|---|---|---|---|
| $C_4$ | $2.4423 \times 10^{-2}$ | $C_6$ | $2.0573 \times 10^{-2}$ | $C_8$ | $-1.8070 \times 10^{-4}$ |
| $C_{10}$ | $-3.0036 \times 10^{-4}$ | $C_{11}$ | $5.6539 \times 10^{-6}$ | $C_{13}$ | $3.6849 \times 10^{-5}$ |
| $C_{15}$ | $4.2238 \times 10^{-6}$ | $C_{17}$ | $3.4114 \times 10^{-6}$ | $C_{19}$ | $1.4841 \times 10^{-6}$ |
| $C_{21}$ | $-5.2650 \times 10^{-8}$ | | | | |

FFS⑧

| | | | | | |
|---|---|---|---|---|---|
| $C_4$ | $2.7289 \times 10^{-3}$ | $C_6$ | $-9.3425 \times 10^{-3}$ | $C_8$ | $4.0283 \times 10^{-2}$ |
| $C_{10}$ | $3.3363 \times 10^{-3}$ | $C_{11}$ | $1.9237 \times 10^{-2}$ | $C_{13}$ | $2.8928 \times 10^{-3}$ |
| $C_{15}$ | $-2.9040 \times 10^{-4}$ | | | | |

Displacement and tilt(1)

| X | 0.00 | Y | 0.00 | Z | 0.00 |
|---|---|---|---|---|---|
| α | 0.00 | β | 0.00 | γ | 0.00 |

Displacement and tilt(2)

| X | 0.00 | Y | 0.00 | Z | 10.00 |
|---|---|---|---|---|---|
| α | 22.50 | β | 0.00 | γ | 0.00 |

Displacement and tilt(3)

| X | 0.00 | Y | −6.00 | Z | 4.00 |
|---|---|---|---|---|---|
| α | 67.50 | β | 0.00 | γ | 0.00 |

Displacement and tilt(4)

| X | 0.00 | Y | 6.00 | Z | 4.00 |
|---|---|---|---|---|---|
| α | 90.00 | β | 0.00 | γ | 0.00 |

Displacement and tilt(5)

| X | 0.00 | Y | 10.00 | Z | 4.00 |
|---|---|---|---|---|---|
| α | 100.00 | β | 0.00 | γ | 0.00 |

Variable magnification

| αW | 100.00 | αS | 90.00 | αT | 77.43 |
|---|---|---|---|---|---|

Displacement and tilt(6)

| X | 0.00 | Y | 0.00 | Z | 1.36 |
|---|---|---|---|---|---|
| α | −12.44 | β | 0.00 | γ | 0.00 |

Displacement and tilt(7)

| X | 0.00 | Y | −1.26 | Z | 18.02 |
|---|---|---|---|---|---|
| α | −21.95 | β | 0.00 | γ | 0.00 |

Displacement and tilt(8)

| X | 0.00 | Y | 7.22 | Z | 7.77 |
|---|---|---|---|---|---|
| α | −63.32 | β | 0.00 | γ | 0.00 |

Displacement and tilt(9)

| X | 0.00 | Y | −5.98 | Z | 8.44 |
|---|---|---|---|---|---|
| α | −81.53 | β | 0.00 | γ | 0.00 |

Displacement and tilt(10)

| X | 0.00 | Y | −8.13 | Z | 8.41 |
|---|---|---|---|---|---|
| α | −90.00 | β | 0.00 | γ | 0.00 |

| Surface No. | Radius of curvature | Surface separation and tilt | Refractive index | Abbe's No. |
|---|---|---|---|---|
| Object plane | ∞ | ∞ | | |
| 1 | ∞ (Stop) | (1) | | |
| 2 | FFS① | (1) | 1.7440 | 44.8 |

-continued

| Surface No. | Radius of curvature | Surface separation and tilt | Refractive index | Abbe's No. |
|---|---|---|---|---|
| 3 | FFS② (RE) | (2) | 1.7440 | 44.8 |
| 4 | FFS③ (RE) | (3) | 1.7440 | 44.8 |
| 5 | FFS④ | (4) | | |
| 6 | ∞ (IMP) | (5) | | |
| 7 | FFS⑤ | (6) | 1.6928 | 49.5 |
| 8 | FFS⑥ (RE) | (7) | 1.6928 | 49.5 |
| 9 | FFS⑦ (RE) | (8) | 1.6928 | 49.5 |
| 10 | FFS⑧ | (9) | | |
| Image plane | | (10) | | |

FFS①

| | | | | | |
|---|---|---|---|---|---|
| $C_4$ | $9.0382 \times 10^{-2}$ | $C_6$ | $-2.3680 \times 10^{-1}$ | | |

FFS②

| | | | | | |
|---|---|---|---|---|---|
| $C_4$ | $3.9937 \times 10^{-2}$ | $C_6$ | $-3.2131 \times 10^{-2}$ | $C_8$ | $3.7291 \times 10^{-3}$ |
| $C_{10}$ | $-3.6464 \times 10^{-5}$ | $C_{11}$ | $-9.8820 \times 10^{-4}$ | | |

FFS③

| | | | | | |
|---|---|---|---|---|---|
| $C_4$ | $2.791 \times 10^{-2}$ | $C_6$ | $-3.3861 \times 10^{-2}$ | $C_8$ | $-1.9513 \times 10^{-3}$ |
| $C_{10}$ | $-1.8989 \times 10^{-3}$ | $C_{11}$ | $1.9138 \times 10^{-5}$ | | |

FFS④

| | | | | | |
|---|---|---|---|---|---|
| $C_4$ | $4.5840 \times 10^{-2}$ | $C_6$ | $-8.9426 \times 10^{-2}$ | $C_8$ | $-7.4906 \times 10^{-3}$ |

FFS⑤

| | | | | | |
|---|---|---|---|---|---|
| $C_4$ | $2.4394 \times 10^{-2}$ | $C_6$ | $-1.7965 \times 10^{-2}$ | | |

FFS⑥

| | | | | | |
|---|---|---|---|---|---|
| $C_4$ | $7.8981 \times 10^{-3}$ | $C_6$ | $-4.3738 \times 10^{-3}$ | $C_8$ | $-2.9007 \times 10^{-4}$ |
| $C_{10}$ | $-8.2762 \times 10^{-5}$ | | | | |

FFS⑦

| | | | | | |
|---|---|---|---|---|---|
| $C_4$ | $2.2292 \times 10^{-2}$ | $C_6$ | $1.5507 \times 10^{-2}$ | $C_8$ | $5.6375 \times 10^{-5}$ |
| $C_{10}$ | $-1.2221 \times 10^{-4}$ | | | | |

FFS⑧

| | | | | | |
|---|---|---|---|---|---|
| $C_4$ | $2.6552 \times 10^{-2}$ | $C_6$ | $8.5294 \times 10^{-2}$ | $C_8$ | $5.3538 \times 10^{-2}$ |
| $C_{10}$ | $2.4450 \times 10^{-2}$ | | | | |

Displacement and tilt (1)

| X | 0.00 | Y | 0.00 | Z | 0.00 |
|---|---|---|---|---|---|
| α | 0.00 | β | 0.00 | γ | 0.00 |

Displacement and tilt (2)

| X | 0.00 | Y | 0.00 | Z | 10.00 |
|---|---|---|---|---|---|
| α | 22.50 | β | 0.00 | γ | 0.00 |

Displacement and tilt (3)

| X | 0.00 | Y | −6.00 | Z | 4.00 |
|---|---|---|---|---|---|
| α | 67.50 | β | 0.00 | γ | 0.00 |

Displacement and tilt (4)

| X | 0.00 | Y | 6.00 | Z | 4.00 |
|---|---|---|---|---|---|
| α | 90.00 | β | 0.00 | γ | 0.00 |

Displacement and tilt (5)

| X | 0.00 | Y | 10.00 | Z | 4.00 |
|---|---|---|---|---|---|
| α | 104.48 | β | 0.00 | γ | 0.00 |

Variable magnifciation

| α | W104.48 | αS | 85.44 | αT | 70.00 |
|---|---|---|---|---|---|

Displacement and tilt (6)

| X | 0.00 | Y | 0.00 | Z | 1.00 |
|---|---|---|---|---|---|
| α | 1.17 | β | 0.00 | γ | 0.00 |

Displacement and tilt (7)

| X | 0.00 | Y | 1.14 | Z | 19.66 |
|---|---|---|---|---|---|
| α | −17.71 | β | 0.00 | γ | 0.00 |

Displacement and tilt (8)

| X | 0.00 | Y | 7.89 | Z | 11.20 |
|---|---|---|---|---|---|
| α | −67.10 | β | 0.00 | γ | 0.00 |

Displacement and tilt (9)

| X | 0.00 | Y | −8.76 | Z | 9.60 |
|---|---|---|---|---|---|
| α | −85.32 | β | 0.00 | γ | 0.00 |

Displacement and tilt (10)

| X | 0.00 | Y | −12.24 | Z | 8.81 |
|---|---|---|---|---|---|
| α | −102.79 | β | 0.00 | γ | 0.00 |

Figure 8:
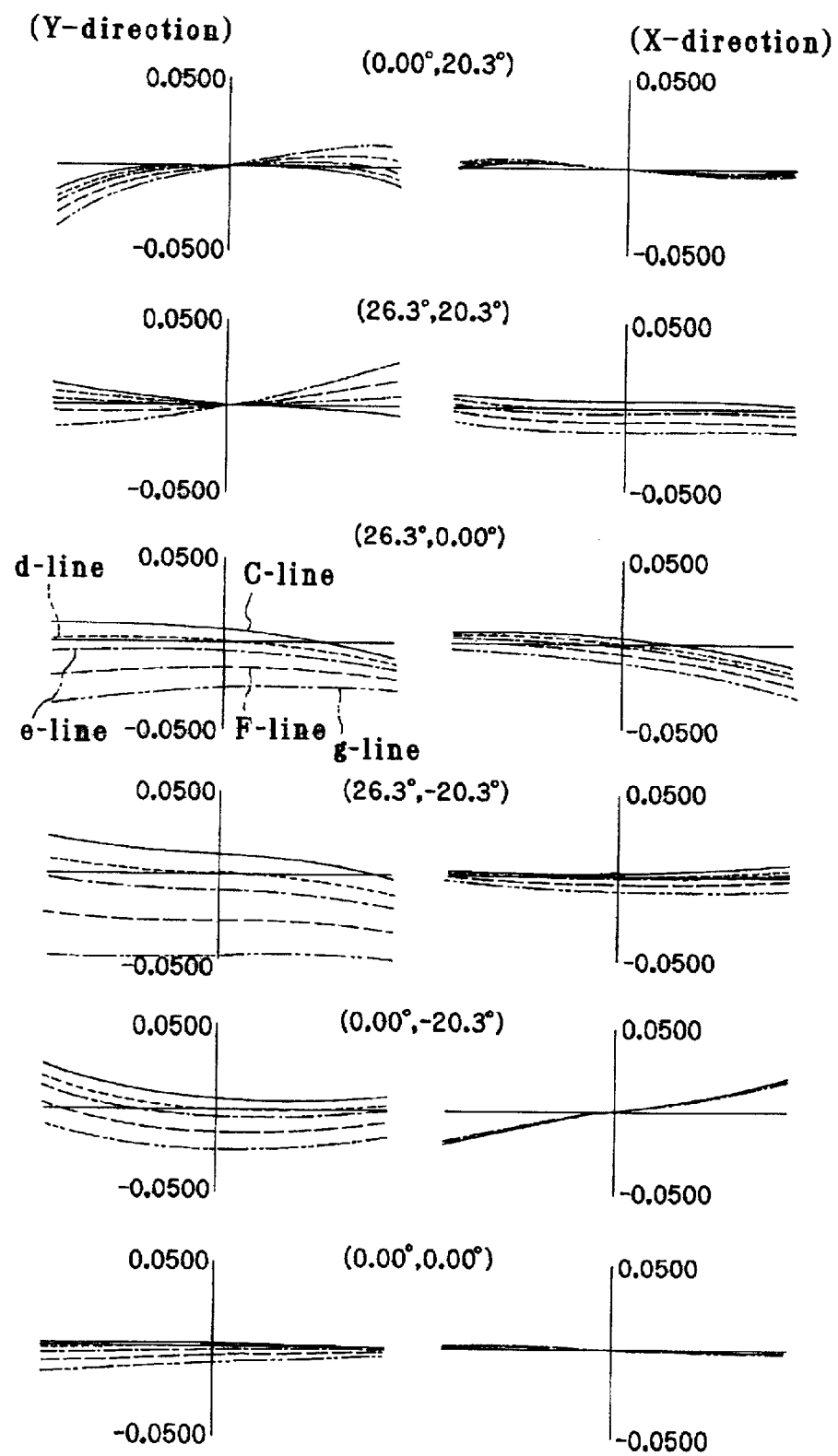
FIG. 8 is a transverse aberration diagram for Example 1 at its wide-angle end.
Figure 9:
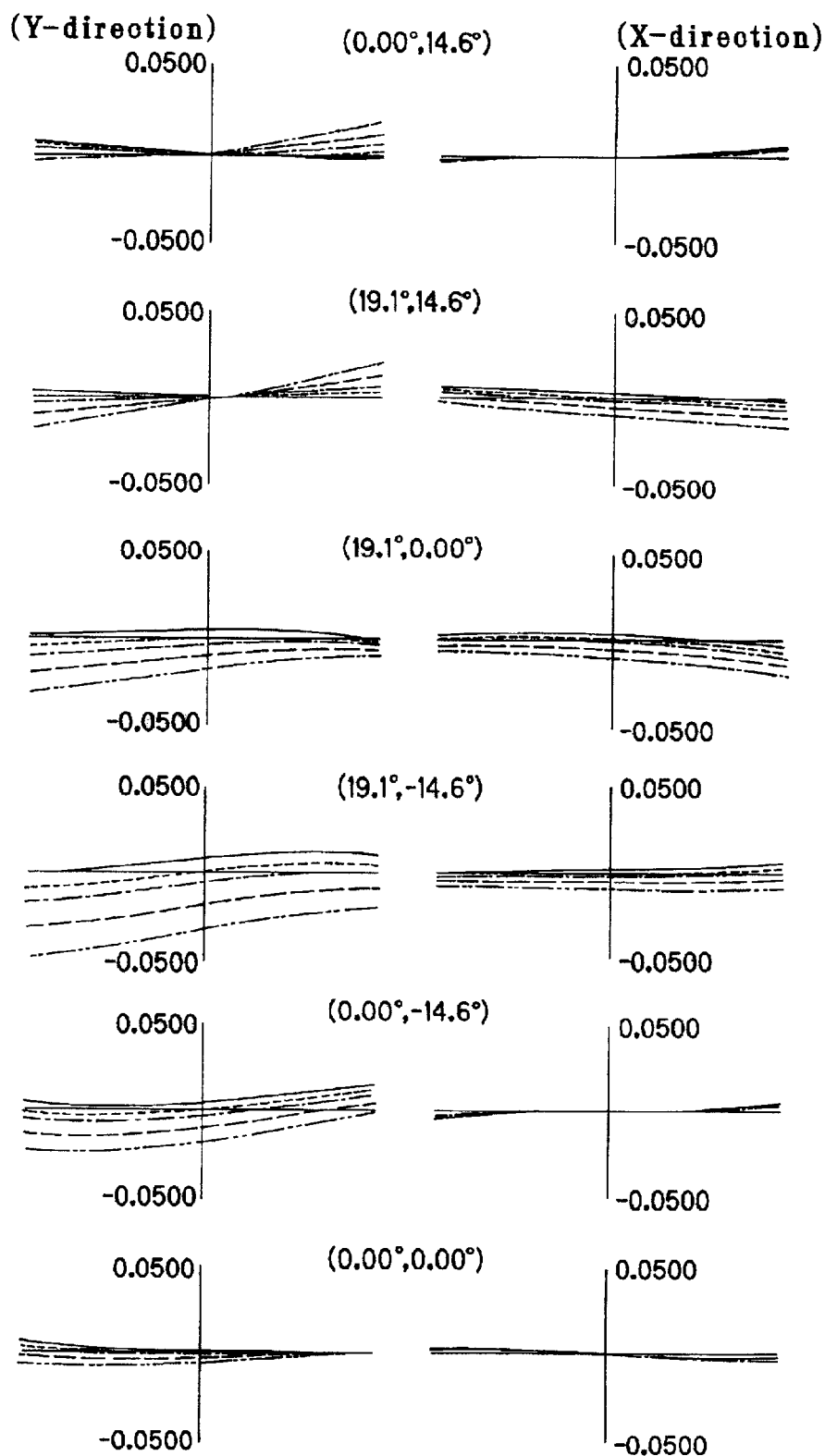
FIG. 9 is a transverse aberration diagram for Example 1 in its standard state.
Figure 10:
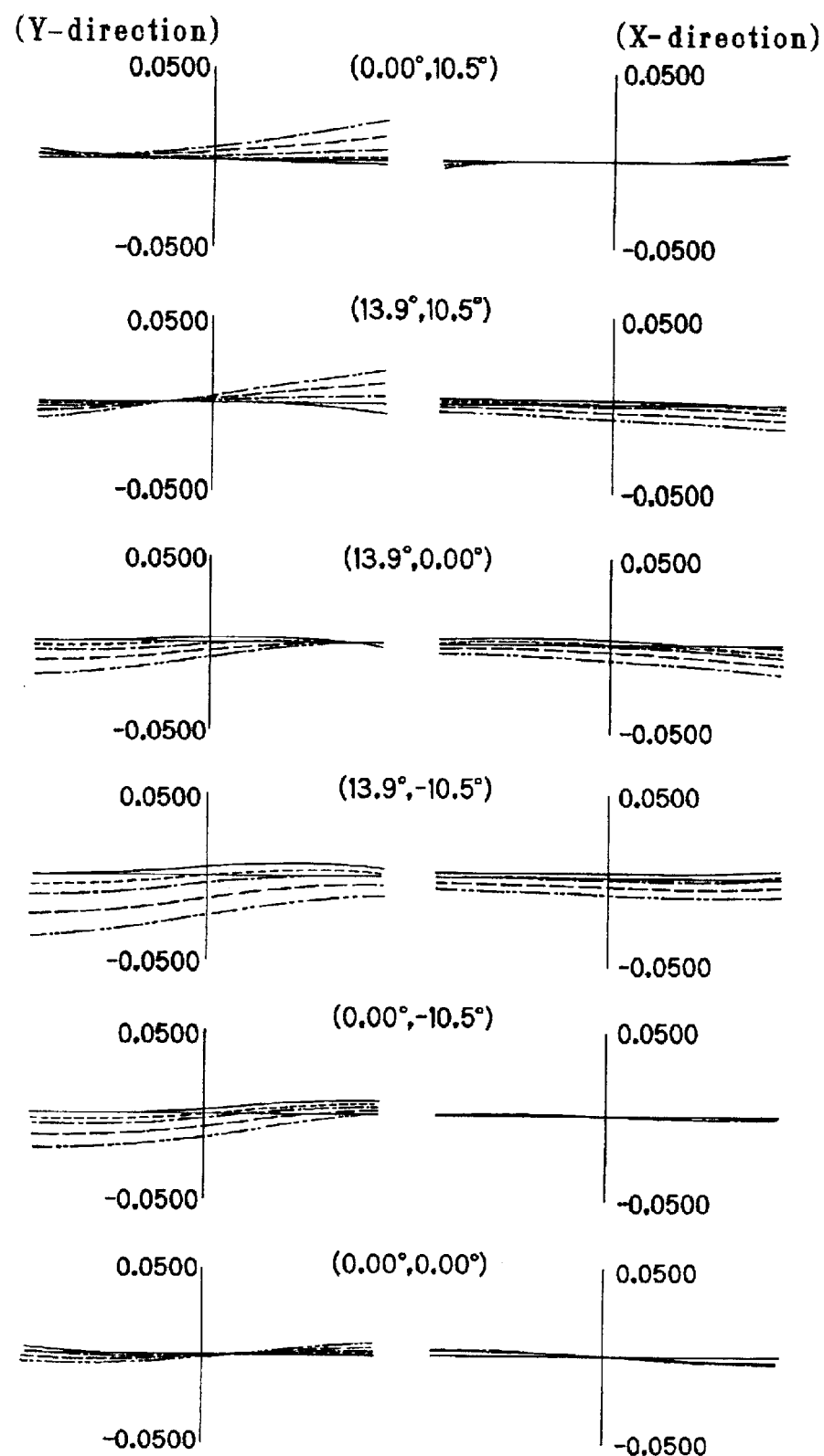
FIG. 10 is a transverse aberration diagram for Example 1 at its wide-angle end.
Figure 11:
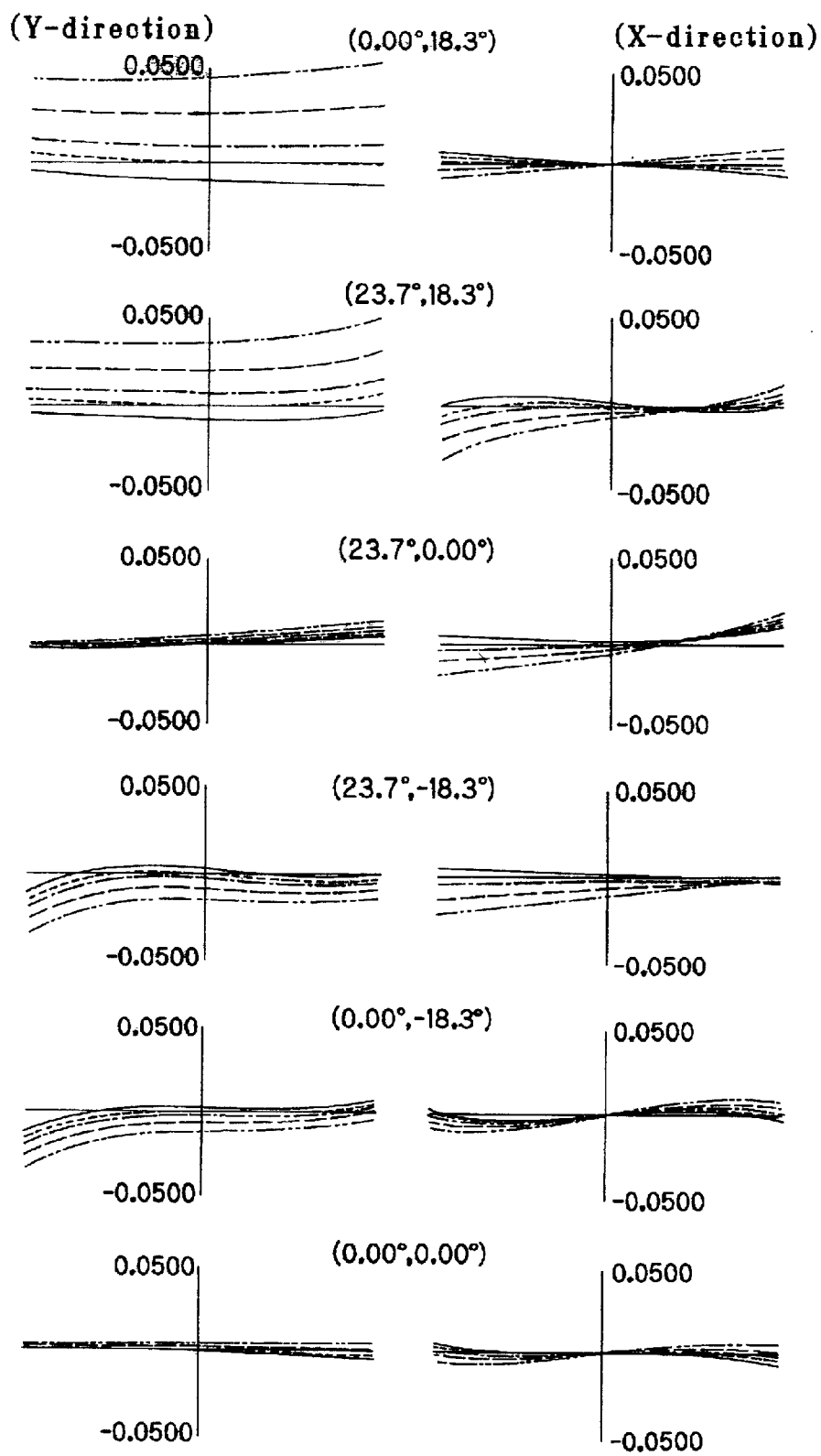
FIG. 11 is a transverse aberration diagram for Example 4 at its wide-angle end.
Figure 12:
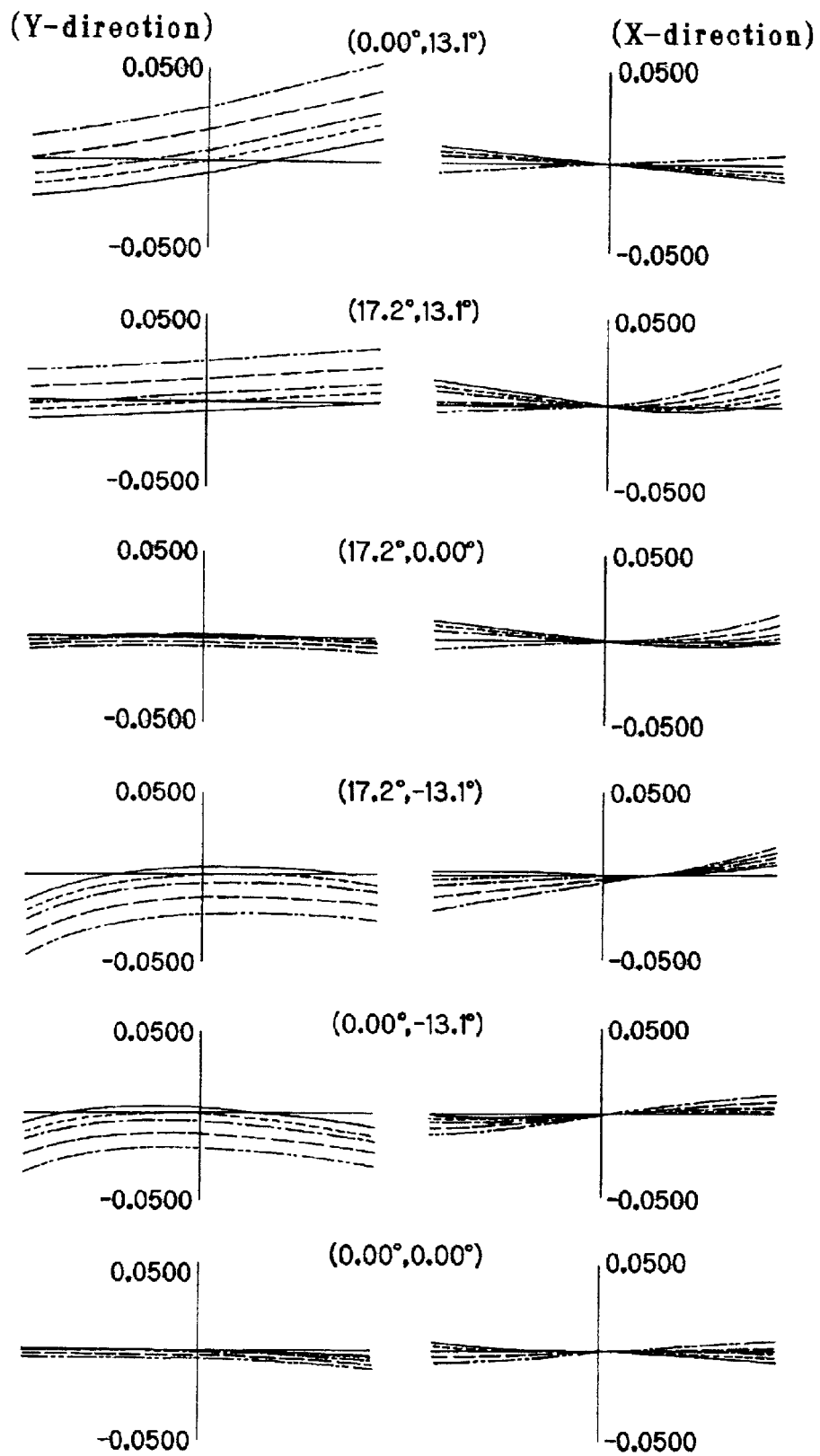
FIG. 12 is a transverse aberration diagram for Example 4 in its standard state.
Figure 13:
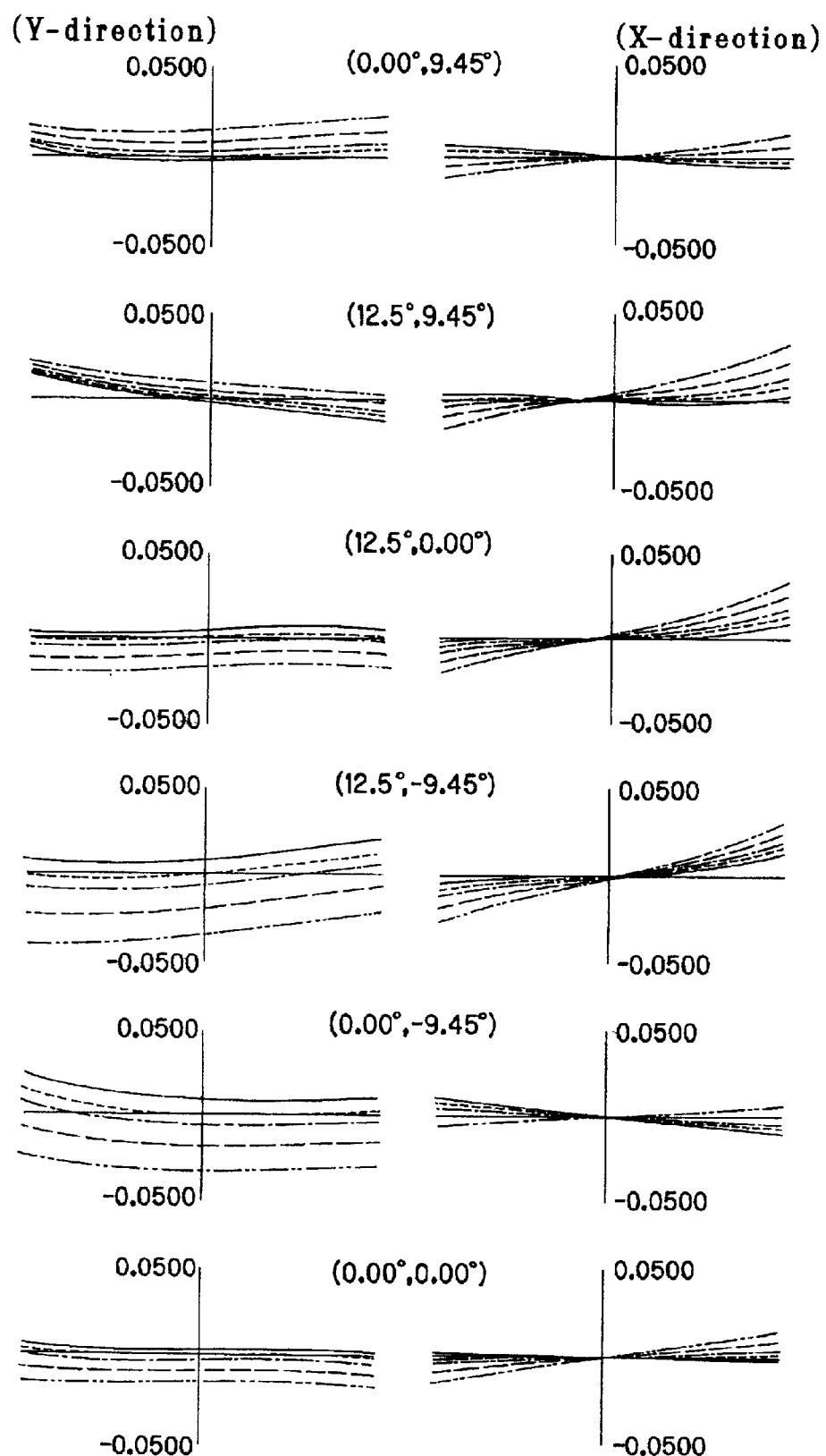
FIG. 13 is a transverse aberration diagram for Example 4 at its wide-angle end.
Figure 14:
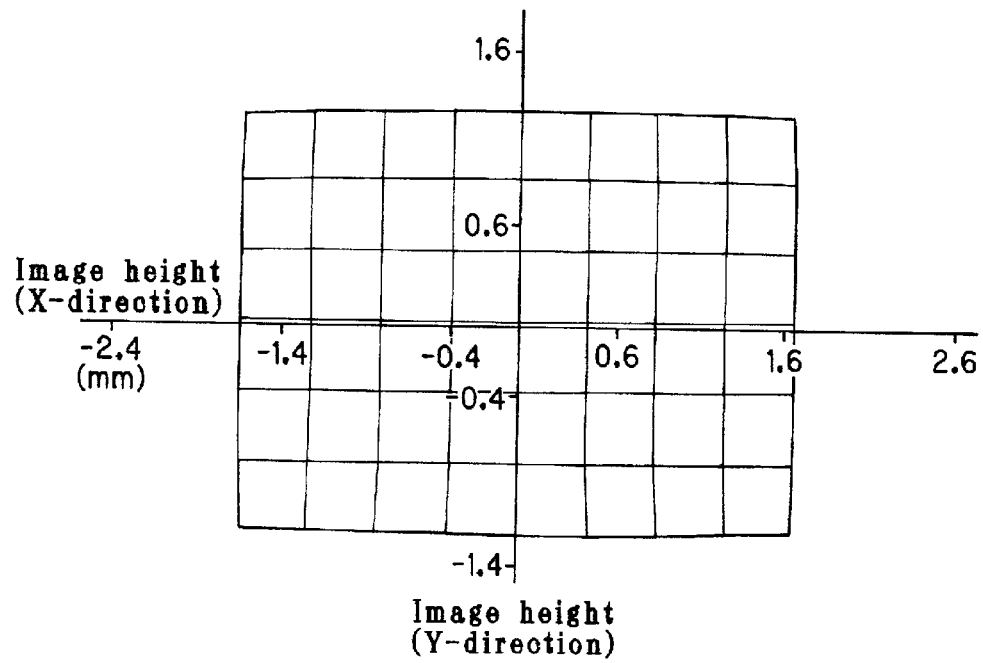
FIG. 14 is an aberration diagram illustrative of an image distortion at the wide-angle end of Example 4.
Figure 15:
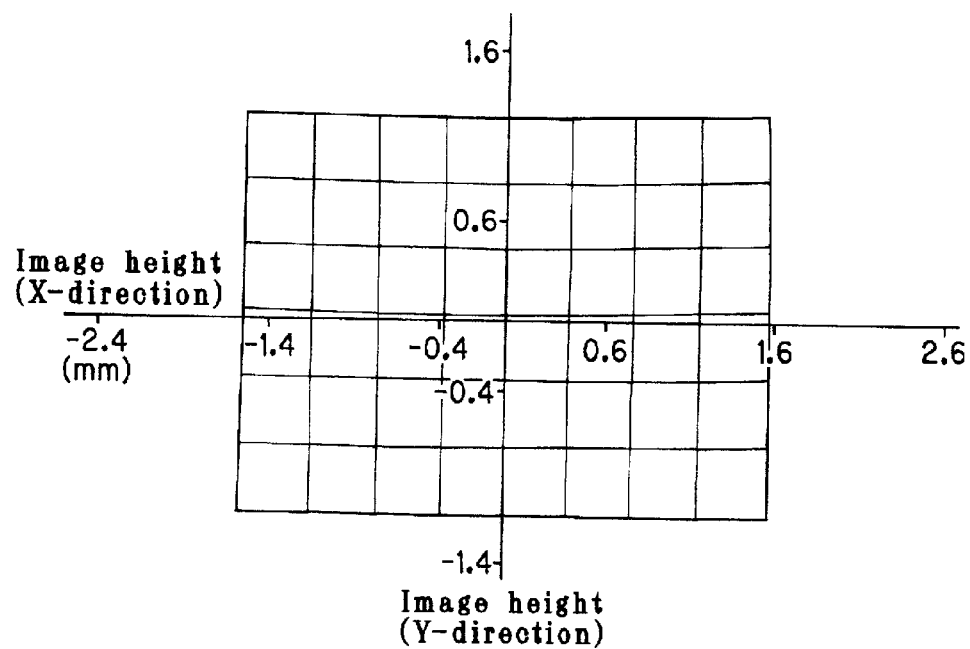
FIG. 15 is an aberration diagram illustrative of an image distortion in the standard state of Example 4.
Figure 16:
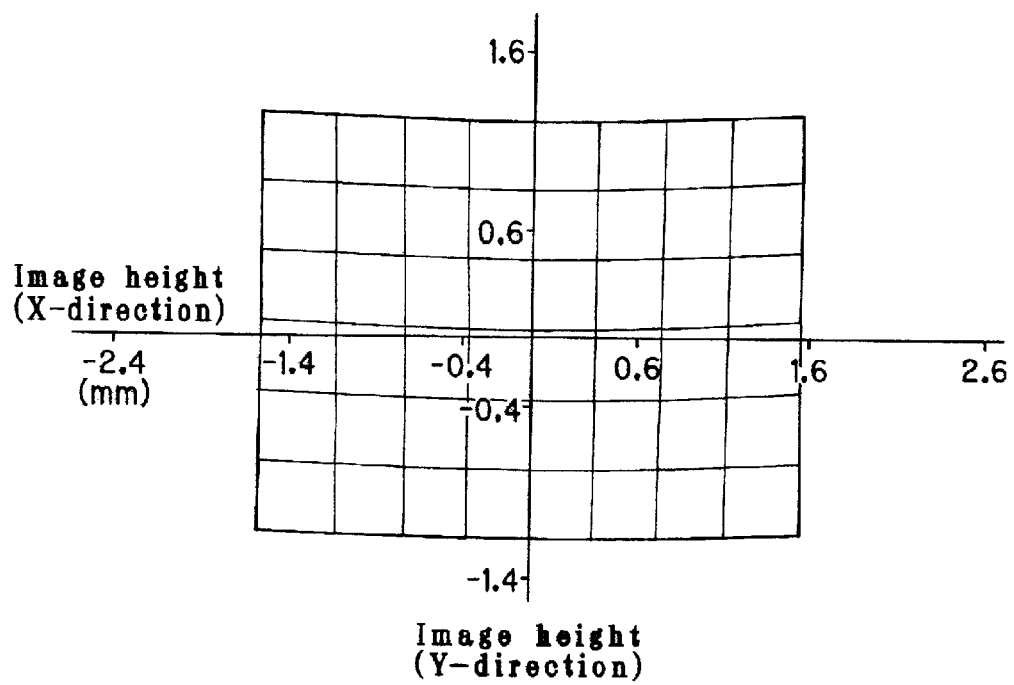
FIG. 16 is an aberration diagram illustrative of an image distortion at the telephoto end of Example 4.

Transverse aberrations for Example 1 at its wide-angle end, in its standard state and at its telephoto end are shown in FIGS. 8, 9 and 10, and those for Example 4 at its wide-angle end, in its standard state and at its telephoto end are shown in FIGS. 11, 12 and 13. In these aberration diagrams, the bracketed figures stand for horizontal and vertical angles of view, at which transverse aberrations are illustrated. Image distortions for Example 4 at its wide-angle end, in its standard state and at its telephoto end are shown in FIGS. 14, 15 and 16.

An optical system for zooming, scaling or the like wherein an optical path is bent somewhere as contemplated herein may have applications for small-sized cameras as an example. One typical such camera is of the box type that uses an optical system comprising two such decentration prisms 10 and 20 as used in Example 3 and shown schematically in FIG. 17. FIGS. 17(a) to 17(c) correspond to the states shown in FIGS. 5(a) to 5(c). This camera is built up of two bendable box members 32 and 33 hinged together at 34. Provided with an opening 31, one box member 32 receives therein one decentration prism 10 in such a manner as to face this opening 31. The other box member 33 receives therein the other decentration prism 20 in such a manner as to face the decentration prism 10, and an electronic image pickup device 30 is located on the image plane of the decentration prism 20. With the thus constructed arrangement, the box member 32 is hinged down as shown in FIG. 17(a), so that the camera can be put into its wide-angle state. Upon standing upright as shown in FIG. 17(b), the camera can be put into the standard state. If the box member 32 is hinged back as shown in FIG. 17(c), the camera can then be placed in the telephoto state.

Figure 5A:
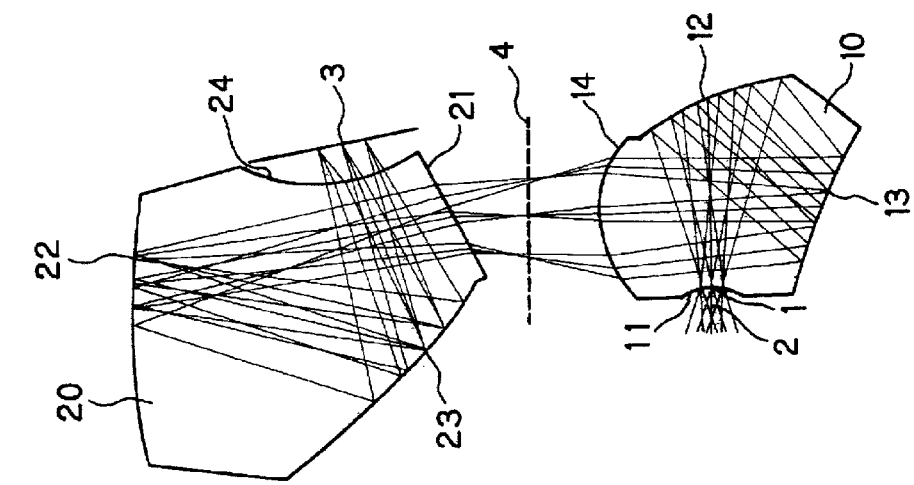
FIGS. 5(a), 5(b) and 5(c) are sectional views of the scaling optical system of Example 3 of the invention at its wide-angle end (a), in its standard state (b) and at its telephoto end (c), respectively.
Figure 5B:
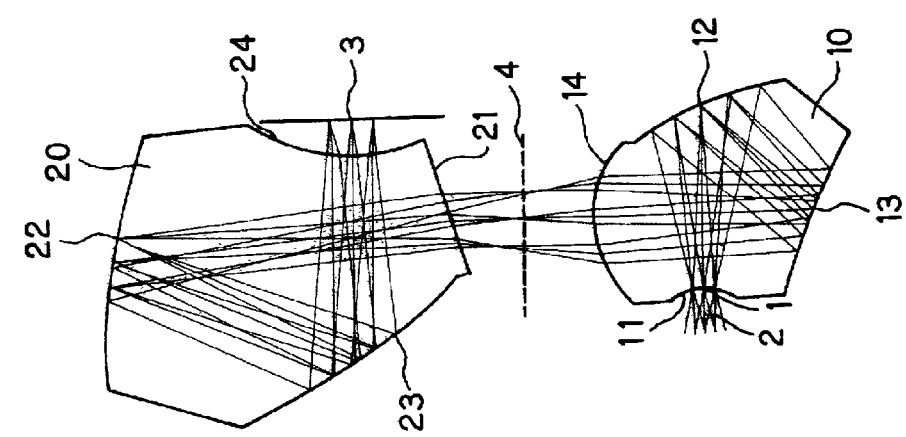
Figure 5C:
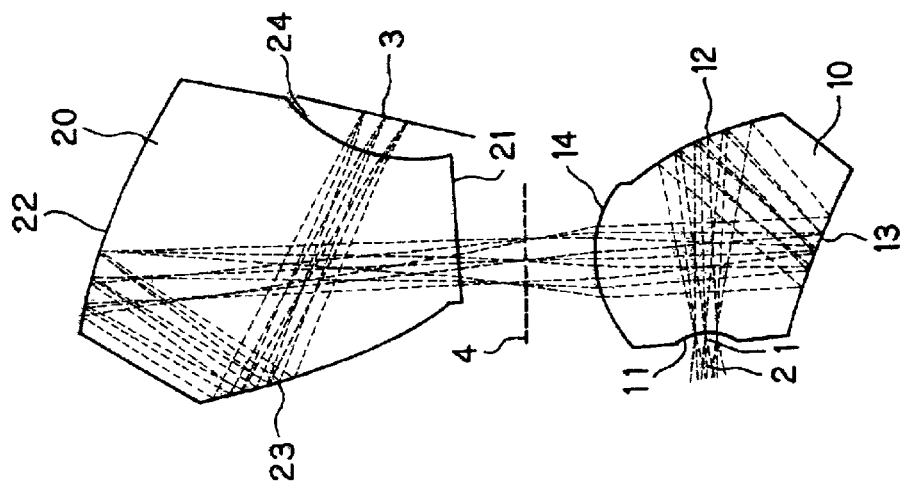
Figure 7A:
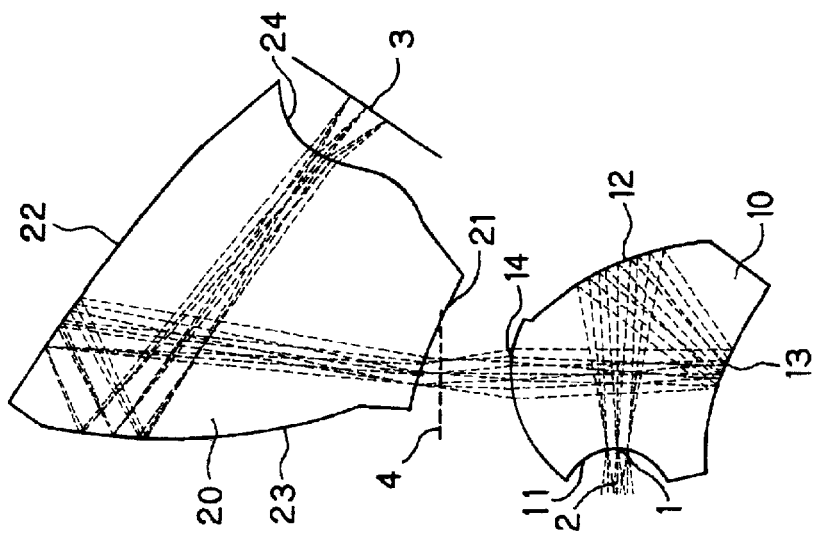
FIGS. 7(a), 7(b) and 7(c) are sectional views of the scaling optical system of Example 5 of the invention at its wide-angle end (a), in its standard state (b) and at its telephoto end (c), respectively.
Figure 7B:
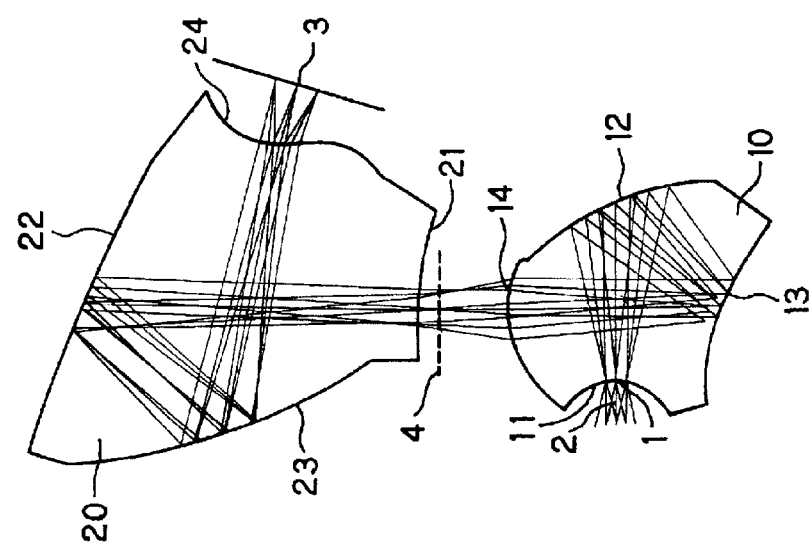
Figure 7C:
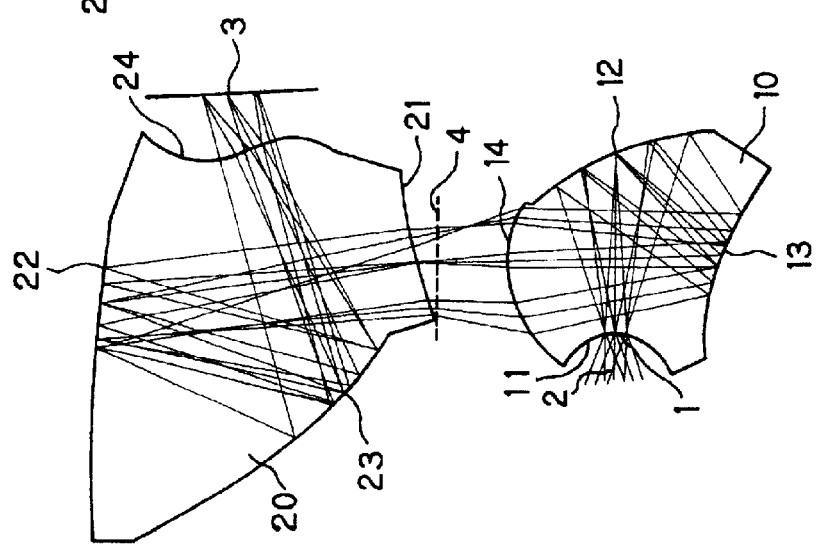
Figures 18A, 18B, 18C:
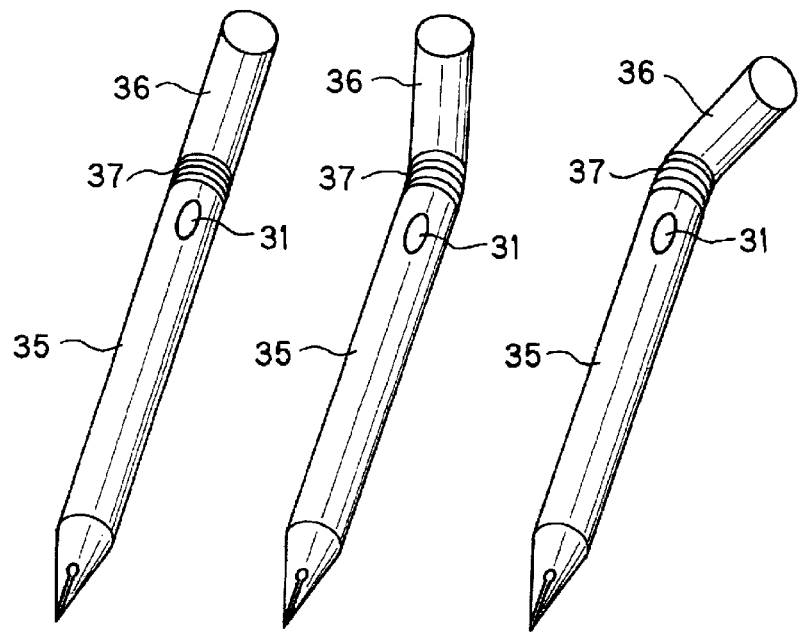
FIGS. 18(a), 18(b), 18(c), 18(d) and 18(e) are illustrative of an exemplary pen type camera using an optical system comprising two decentered prisms according to the invention.
Figure 18D:
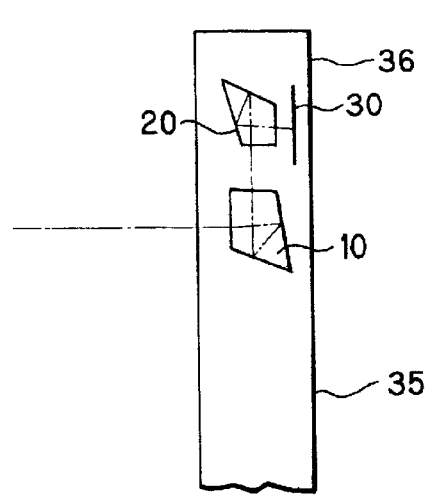
Figure 18E:
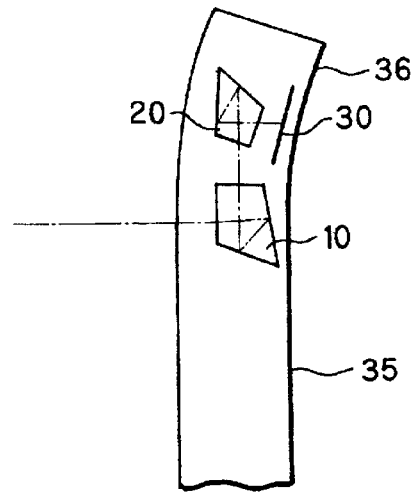

FIG. 18 illustrates one typical pen type camera, and FIGS. 18(a) to 18(c) correspond to the states of FIGS. 5(a) to 5(c). FIGS. 18(d) and 18(e) are sectional views corresponding to the states of FIGS. 18(b) and 18(c). Using an optical system comprising two such decentration prisms 10 and 20 as used in Example 3, this camera is built up of two bendable cylindrical members 35 and 36 hinged together at 37. Provided with an opening 31, one cylindrical member 35 receives therein one decentration prism 10 in such a manner as to face this opening 31. The other cylindrical member 36 receives therein the other decentration prism 20 in such a manner as to face the decentration prism 10, and an electronic image pickup device 30 is located on the image plane of the decentration prism 20. With the thus constructed arrangement, the cylindrical member 36 is hinged down as shown in FIG. 18(a), so that the camera can be put into its wide-angle state. Upon standing upright as shown in FIG. 18(b), the camera can be put into the standard state. If the cylindrical member 36 is hinged back as shown in FIG. 18(c), the camera can then be placed in the telephoto state.

Figure 19:
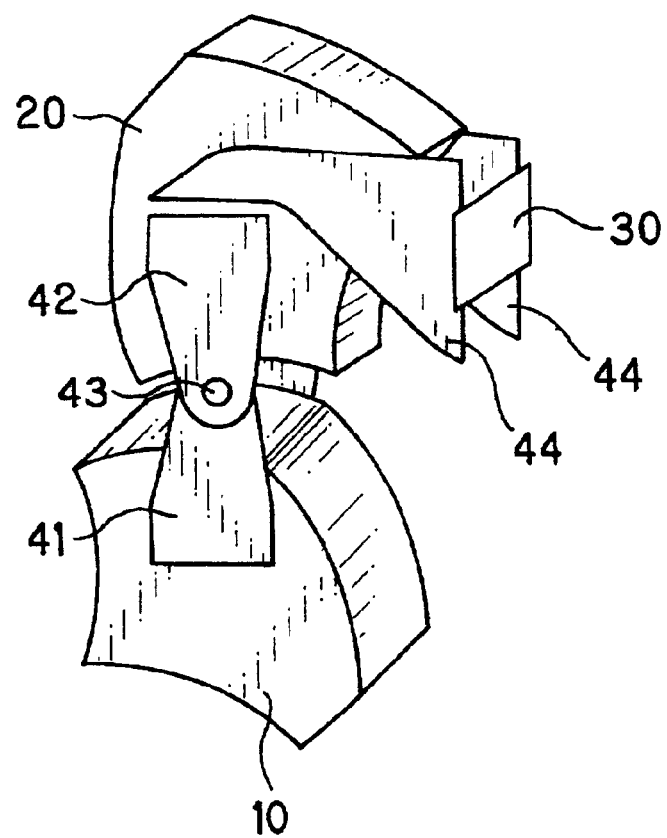
FIG. 19 is a perspective view illustrative of one exemplary mechanical construction for bendably supporting two decentered prisms around the vicinity of an intermediate image.

FIG. 19 is a perspective view of one specific mechanical arrangement for supporting two decentration prisms 10 and 20 so that they are bendable around the vicinity of an intermediate image. A pair of mounting fixtures 41 are integrally fixed onto both sides of the decentration prism 10 while a pair of mounting fixtures 42 are integrally fixed onto both sides of the decentration prism 20. Associated ends of the mounting fixtures 41 and 42 are joined together for rotation around a shaft 43, so that the inventive optical system comprising two such decentration prisms 10 and 20 can be bent at its intermediate portion. If a pair of separate supporting fixtures 44 are integrally fixed onto both sides of the decentration prism 20 to mount an image pickup device 30 at their ends, it is then possible to rotate the image pickup device 30 together with the decentration prism 20 around the shaft 43 in the vicinity of an intermediate image.

As can be appreciated from the foregoing, the present invention can provide an optical system that enables optical parameters such as magnification and focus to be controlled through simple construction wherein a plurality of optical elements are mutually decentered.

I claim:

1. An optical system, comprising:

a first optical element including a plurality of optical surfaces;

a second optical element including a plurality of optical surfaces, and a moving mechanism for varying relative positions of said first optical element and said second optical element, wherein:

at least one of said plurality of optical surfaces in said first optical element and said second optical element has a rotationally asymmetric shape, and said moving mechanism varies said relative positions in such a way as to change a given position, wherein said given position is defined by a position where an optical axis on an exit side of said first optical element intersects the optical surfaces of said second optical element.

2. The optical system according to claim 1, wherein said rotationally asymmetric optical surface is a continuous surface.

3. The optical system according to claim 1, which satisfies the following condition:

$$0.5 < |Fy/Fx| < 2 \qquad (2)$$

where Fx is a focal length of the optical system in an X direction and Fy is a focal length of the optical system in a Y direction, wherein a Y-axis direction is a direction of decentration of the optical system and said X direction is orthogonal to a plane (Y-Z plane) parallel with an axial chief ray.

4. An imaging system, comprising:

an optical system as recited in claim 1;

an image pickup device located at an image position of said optical system;

a first holder member for holding said first optical element;

a second holder member for holding said second optical element; and a joining member interposed between said first holder member and said second holder member, wherein said joining member has a structure for varying relative positions of said first holder member and said second holder member.

5. The optical system according to claim 1, wherein said moving mechanism rotates said first optical element.

6. The optical system according to claim 1, wherein said moving mechanism rotates said second optical element.

7. The optical system according to claim 6, which satisfies the following condition:

$$0° < \theta < 90° \qquad (1)$$

where $\theta$ is an angle of rotation of said second optical element.

8. The optical system according to claim 1, wherein:

said first optical element comprises:

an entrance surface through which light transmits, an exit surface through which said light transmits, and a reflecting surface located in an optical path running from said entrance surface to said exit surface, and said second optical element comprises:
an entrance surface through which light transmits,
an exit surface through which said light transmits, and
a first reflecting surface and a second reflecting surface located in an optical path running from said entrance surface to said exit surface.

9. The optical system according to claim 1, wherein:
each optical surface of said second optical element is located such that a first optical path intersects a second optical path, wherein said first optical path runs from said entrance surface to said first reflecting surface, and said second optical path runs from said second reflecting surface to said exit surface.

10. The optical system according to claim 1, wherein an image is formed only by said first optical element and said second optical element.

11. An optical system, comprising:
a first optical element having a plurality of optical surfaces;
a second optical element having a plurality of optical surfaces; and
a moving mechanism for varying relative positions of said first optical element and said second optical element, wherein:
at least one surface of said plurality of optical surfaces in said first optical element and said second optical element has a rotationally asymmetric shape, and
said moving mechanism rotates around any arbitrary point, thereby varying said relative positions.

12. The optical system according to claim 6 or 11, wherein said first optical element forms a primary image, and said moving mechanism rotates around said primary image.

* * * * *